US 7,245,836 B2

(12) United States Patent
Mitsu et al.

(10) Patent No.: US 7,245,836 B2
(45) Date of Patent: Jul. 17, 2007

(54) OPTICAL PULSE TIMING DETECTION APPARATUS, OPTICAL PULSE TIMING DETECTION METHOD, OPTICAL PULSE TIMING ADJUSTMENT APPARATUS, AND OPTICAL PULSE TIMING ADJUSTMENT METHOD

(75) Inventors: Hiroyuki Mitsu, Ashigarakami-gun (JP); Makoto Furuki, Ashigarakami-gun (JP); Izumi Iwasa, Ashigarakami-gun (JP); Yasuhiro Sato, Ashigarakami-gun (JP); Satoshi Tatsuura, Ashigarakami-gun (JP); Minquan Tian, Ashigarakami-gun (JP); Makoto Naruse, Koganei (JP)

(73) Assignees: Fuji Xerox Co., Ltd., Tokyo (JP); National Institute of Information and Communications Technology, Tokyo (JP)

( * ) Notice: Subject to any disclaimer, the term of this patent is extended or adjusted under 35 U.S.C. 154(b) by 610 days.

(21) Appl. No.: 10/715,436

(22) Filed: Nov. 19, 2003

(65) Prior Publication Data
US 2004/0101301 A1 May 27, 2004

(30) Foreign Application Priority Data
Nov. 22, 2002 (JP) .............................. 2002-340057

(51) Int. Cl.
*H04B 10/08* (2006.01)
*H04B 10/00* (2006.01)
*H04B 10/02* (2006.01)

(52) U.S. Cl. .................... 398/158; 398/192; 398/12; 398/19; 398/33

(58) Field of Classification Search ................ 398/182, 398/158, 191, 192; 356/73.1, 5.09, 5.07, 356/204
See application file for complete search history.

(56) References Cited
U.S. PATENT DOCUMENTS 4,615,617 A * 10/1986 Frank et al. ................ 356/5.07
4,960,329 A * 10/1990 Schofield ................... 356/5.09

(Continued)

FOREIGN PATENT DOCUMENTS

JP     A 11-15031     1/1999

(Continued)

OTHER PUBLICATIONS

F. Salin et al. "Single-shot measurement of a 52-fs pulse", Applied Optics, vol. 26, No. 21, Nov. 1, 1987, pp. 4528-4531.

*Primary Examiner*—Dalzid Singh
(74) *Attorney, Agent, or Firm*—Oliff & Berridge, PLC

(57) ABSTRACT

Incident signal beam pulses are transmitted by an on-state region, and an optical path for the signal beam pulses is spatially switched in an optical switch. Signal beam pulses transmitted by the on-state region of the optical switch are detected at a pixel corresponding to a transmitting region of a photo-detector equipped with a plurality of pixels. A timing computation unit acquires position information of a pixel at which a predetermined signal beam pulse has been detected, on the basis of a result of the detection conducted by the photo-detector, and computes timing of arrival of a predetermined signal beam pulse at the optical switch on the basis of the position information of the pixel and time when a region corresponding to the pixel is brought to an on-state.

25 Claims, 15 Drawing Sheets

U.S. PATENT DOCUMENTS

| | | | |
|---|---|---|---|
| 5,000,568 A * | 3/1991 | Trutna, Jr. et al. | 356/73.1 |
| 6,118,463 A * | 9/2000 | Houki et al. | 347/116 |
| 6,172,788 B1 * | 1/2001 | Suzuki et al. | 359/204 |
| 6,307,393 B1 * | 10/2001 | Shimura | 324/765 |
| 6,778,783 B2 * | 8/2004 | Okayasu et al. | 398/182 |
| 6,819,876 B2 * | 11/2004 | Okayasu et al. | 398/182 |
| 6,937,372 B2 * | 8/2005 | Kandori et al. | 359/198 |
| 7,054,850 B2 * | 5/2006 | Matsugu | 706/48 |

FOREIGN PATENT DOCUMENTS

| | | |
|---|---|---|
| JP | A 2001-53684 | 2/2001 |
| JP | A 2002-258333 | 9/2002 |

* cited by examiner

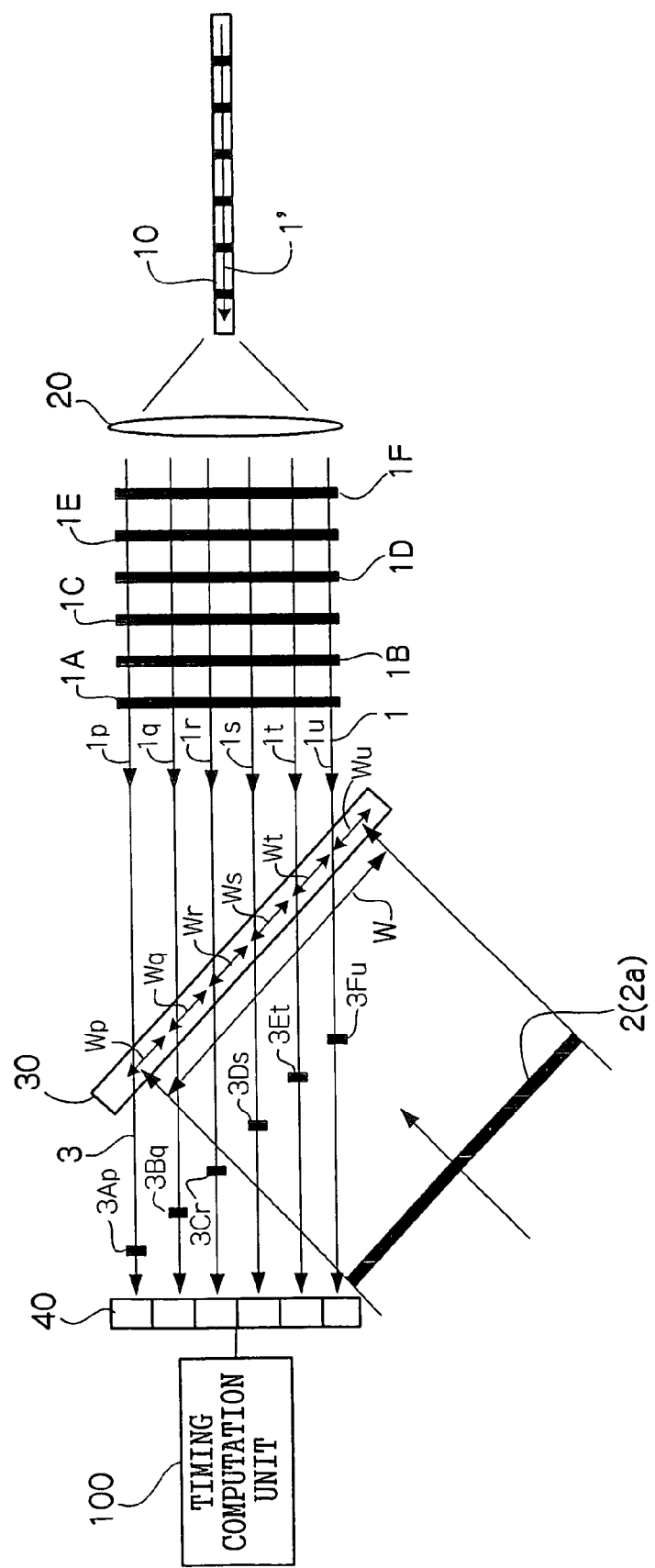

OPTICAL PULSE TIMING DETECTION APPARATUS, OPTICAL PULSE TIMING DETECTION METHOD, OPTICAL PULSE TIMING ADJUSTMENT APPARATUS, AND OPTICAL PULSE TIMING ADJUSTMENT METHOD

CROSS-REFERENCE TO RELATED APPLICATION

This application claims priority under 35 USC 119 from Japanese Patent Application No. 2002-340057, the disclosure of which is incorporated by reference herein.

BACKGROUND OF THE INVENTION

1. Field of the Invention

The present invention relates to an optical pulse timing detection apparatus, an optical pulse timing detection method, an optical pulse timing adjustment apparatus, and an optical pulse timing adjustment method. In particular, the invention relates to an optical pulse timing detection apparatus and an optical pulse timing detection method capable of detecting timing fluctuation of an optical pulse or a pulse sequence with a timing resolution on the order of femto-seconds, and an optical pulse timing adjustment apparatus and an optical pulse timing adjustment method for adjusting timing of an optical pulse or a optical pulse sequence on the basis of a result of the detection. In other words, the invention relates to a jitter skew measurement and compensation scheme in the ultra-high speed optical signal measurement technique and the ultra-high speed optical communication technique such as optical time division multiplexing.

2. Description of the Related Art

In signal processing, signal transmission and measurement using optical pulses, time fluctuation in the optical pulses becomes a chief factor which deteriorates a ratio of signal to noise and a resolution. On the other hand, it is known that electrical detection of a minute time difference is very difficult in the optical pulse measurement. For example, in the ultra-high speed OTDM (Optical Time Division Multiplexing), the pulse spacing becomes one picosecond (ps=10-12 second) or less. In the optoelectronic technique involving optoelectronic conversion, the timing fluctuation of optical pulses cannot be detected in principle. However, measurement and control of such high speed optical phenomena are techniques indispensable for implementing high speed optical pulse transmission.

At the present time, experimental verification for an ultra-high speed OTDM technique on the order of tera bits is being conducted. Frequently, in this experimental verification, a pulse light source (such as an embodiment lock laser) of 40 giga bit/sec (Gbit/sec) or 10 Gbit/sec is used. A bit sequence of 40 Gbit/s or 10 Gbit/s is generated by a combination of the pulse light source and an optical modulator. Bit sequences from N pulse light sources are provided with suitable time differences by optical waveguides, replicated and combined. As a result, the bit sequences are multiplexed at a bit rate that is N times of the original pulse light source.

In the case where verification of the fundamental performance in the dispersion compensation or the optical transmission is aimed at, it can be coped with by the above-described configuration as well. For forming time slots of the ultra-high speed OTDM by using information from separate signal sources, it is necessary to establish a technique for multiplexing signals from a plurality of signal sources while providing them with minute time differences. For example, in the case where optical pulses from signal sources 1 to 4 are multiplexed by a multiplexer MUX to obtain an OTDM signal, individual signal sources or various systems coupling them to each other are subject to disturbance caused by various causes, and consequently how optical pulses from respective signal sources are incorporated into appropriate time slots A to D of the OTDM signal properly becomes a problem. In addition, in the ultra-high speed OTDM, each time slot has only a picosecond or so, and consequently only jitter of 300 femto-second or so is allowed. In the case where jitter must be corrected thus strictly, it is necessary to measure and correct jitter in real time.

As a conventional method for detecting temporal fluctuation or discrepancy in the optical pulses, a method using nonlinear optical crystal and utilizing a sum frequency and a difference frequency proposed by F. Salin etc. is generally known (for example, F. Salin, P. Georges, G. Roger, and A. Brun, "Single-shot measurement of a 52-fs pulse," Applied Optics, Vol. 26, No. 21, 1987, which is hereafter referred to as paper 1). According to this method, two optical pulses are incident on a nonlinear optical crystal so as to partially overlap each other in the temporal position relation, and a sum-frequency beam corresponding to the sum (or difference) of the frequencies is generated at that time. The sum-frequency beam is received by a receiver, and a point having the highest light intensity is regarded as a point at which the two optical pulses coincide with each other in temporal position. On the basis of a difference in intensity between that point and a point having discrepancy in temporal position, a time difference from the coinciding point. i.e., the temporal discrepancy between the optical pulses is calculated.

Furthermore, a timing detection circuit for ultra-high speed optical pulses including a sum-frequency optical receiver for observing the sum-frequency beam by using the method described in the paper 1 has also been proposed (see, for example, FIG. 4 and paragraphs 0063 and 0064 in Japanese Patent Application Laid-Open (JP-A) No. 2001-53684, which is hereafter referred to as paper 2). In this timing detection circuit, optical pulse timing is adjusted and controlled to be in an optimum delayed position by detecting an increase or decrease in the received signal in the sum-frequency optical receiver by means of a signal discrimination circuit and feeding back a result of the detection to an optical delay control circuit (an optical path length controller) as a delay control signal.

It is also possible to use a photo-detection element for generating photo current caused by two photon absorption, instead of nonlinear optical crystal for generating the sum-frequency beam. When utilizing photo current caused by two photon absorption, a time difference is calculated by measuring an increase or decrease in photo current caused by two photon absorption that occurs in the overlapping portion of the pulse.

However, the optical pulse timing detection method using the sum (difference) frequency or the photo current caused by two photon absorption is unsuitable for the real-time measurement. In the optical pulse timing detection method using the sum (difference) frequency or the photo current caused by two photon absorption, a peak position (pulse overlapping) is first detected and the time difference is measured by using the difference of light intensity (power in the case of two-photon absorption) on the basis of the peak position. Therefore, it is hard to grasp at a glance how large the time difference is, and the measurement costs too much labor.

Furthermore, in the optical pulse detection method using the sum (difference) frequency, fundamentally the sum (difference)-frequency beam is not coaxial with a detection subject beam. If the wavelength of the optical pulse changes, it is necessary to change the angle of the crystal and the angle of the detector, resulting in a problem of complicated adjustment. Since the nonlinear optical effect is used, there is a problem that detection is difficult in the case of an optical pulse having weak intensity.

In addition, in the optical pulse timing detection method using the photo current caused by two photon absorption, both the detection subject optical pulse and the reference optical pulse must be very strong in intensity for obtaining an on/off ratio of some degree. This results in a problem that background noise also increases.

The invention has been achieved in order to solve the above-described problems. It is an object of the invention to provide an optical pulse timing detection apparatus and an optical pulse timing detection method capable of detecting timing fluctuation in an optical pulse or an optical pulse sequence with a time resolution on the order of femto-seconds and in real time.

It is another object of the invention to provide an optical pulse timing adjustment apparatus and an optical pulse timing adjustment method capable of adjusting timing in an optical pulse or an optical pulse sequence with a time resolution on the order of femto-seconds and in real time.

SUMMARY OF THE INVENTION (Optical Pulse Timing Detection Apparatus)

In order to achieve the object, an optical pulse timing detection apparatus according to the present invention includes an optical switch for forming an on-state region at only an irradiated portion thereof when irradiated with a control beam pulse, transmitting or reflecting incident signal beam pulses at the on-state region so as to spatially switch an optical path for the signal beam pulses, a photo-detector equipped with a plurality of pixels to detect signal beam pulses transmitted or reflected at the on-state region of the optical switch, at a pixel corresponding to the region, and a timing computation unit for acquiring position information of a pixel, at which a predetermined signal beam pulse has been detected, on the basis of a result of the detection conducted by the photo-detector, and computing timing of arrival of a predetermined signal beam pulse at the optical switch on the basis of the position information of the pixel and a time when a region corresponding to the pixel is brought into an on-state.

In the optical pulse timing detection apparatus according to the invention, an optical switch for forming an on-state region on only an irradiated portion when irradiated with a control beam pulse is irradiated with a control beam pulse. Incident signal beam pulses are transmitted or reflected by the on-state region, and an optical path for the signal beam pulses is spatially switched. Signal beam pulses transmitted or reflected by the on-state region of the optical switch are detected at a pixel corresponding to the region of a photo-detector equipped with a plurality of pixels. By thus associating pixels of the photo-detector with regions of the optical switch, a region associated with a pixel can be specified from the position information of the pixel.

The timing computation unit acquires position information of a pixel at which a predetermined signal beam pulse has been detected, on the basis of a result of the detection conducted by the photo-detector, and computes timing of arrival of a predetermined signal beam pulse at the optical switch on the basis of the position information of the pixel and time when a region corresponding to the pixel is brought to an on-state. In other words, if position information of a pixel at which a predetermined signal beam pulse has been detected is acquired, time corresponding to the pixel can be specified from the position information of this pixel. If time when this region is brought to the on-state is found, timing of arrival of a predetermined signal beam pulse at the optical switch can be found. In this way, since complicated computations are not conducted in the timing computation unit, measurement in real time becomes possible.

At this time, the detection precision in the timing of arrival of a signal beam pulse at the optical switch depends on the switching speed of the optical switch. According to the invention, the optical switch is switched by irradiation of a control beampulse. Therefore, the optical switch can be turned on/off by a control beam pulse on the order of femto-seconds. Accordingly, timing fluctuation of the beam pulse or pulse sequence can be detected with a time resolution on the order of femto-seconds.

In the optical pulse timing detection apparatus, the optical switch can be disposed so as to be perpendicular to the travel direction of incident signal beam pulses and so as to be inclined at a predetermined angle to the travel direction of the control beam pulse. In this case, the optical switch is scanned in a predetermined direction by the control beam pulse, and on-state regions are formed successively as if a slit is moved. Furthermore, by suitably changing the inclination angle of the optical switch, the time resolution and dynamic range of timing detection can be adjusted.

The optical switch may be disposed so as to be perpendicular to the travel direction of the control beam pulse and so as to be inclined at a predetermined angle to the travel direction of the incident signal beam pulses. In this case, the whole irradiated region of the optical switch is brought to the on-state at a predetermined time interval by the control beam pulse. It is preferable to irradiate the optical switch with the control beam pulse in synchronism with the incidence timing of the signal beam pulses. In this case as well, the time resolution and dynamic range of timing detection can be adjusted by suitably changing the inclination angle of the optical switch.

In the optical pulse timing detection apparatus, for example, a spot beam position sensor using surface resistance of a photodiode, a CCD camera, or a photo-detector array can be used as the photo-detector. An expansion optical system or a compression optical system may be disposed between the photo-detector and the optical switch. The time resolution and dynamic range of timing detection can be adjusted by suitably changing the image forming magnification on the photo-detector.

As the optical switch, an optical switch having a functional thin film including a nonlinear optical material, whose absorption coefficient is changed by beam irradiation, and whose relaxation time is short, can be used. In this optical switch, the on-state region may be formed by using over saturated absorption in the nonlinear optical material, or may be formed by using the optical Kerr effect of the nonlinear optical material. As the functional thin film, a dye molecular film is preferable, and a dye molecular film including a J-aggregate substance of squarylium dye is especially preferable.

In the optical pulse timing detection apparatus, a signal processing apparatus for conducting signal processing on the basis of the output of the photo-detector can be provided. For example, when signal pulses of a fixed shape are measured with respect to a plurality of pixels on a CCD or a photo-detector array, it becomes possible to detect the existence position of a signal beam pulse with a precision of subpixel by calculating the position of the center of gravity of detected output signals.

(Optical Pulse Timing Detection Method)

In order to achieve the object, an optical pulse timing detection method according to the invention includes the steps of using an optical switch for forming an on-state region at only an irradiated portion when irradiated with a control beam pulse, irradiating the optical switch with a control beam pulse, and transmitting or reflecting incident signal beam pulses at the on-state region so as to spatially switch an optical path for the signal beam pulses, detecting signal beam pulses transmitted or reflected by the on-state region of the optical switch, at a pixel corresponding to the region of a photo-detector equipped with a plurality of pixels, acquiring position information of a pixel at which a predetermined signal beam pulse has been detected, on the basis of a result of the detection conducted by the photo-detector, and computing timing of arrival of a predetermined signal beam pulse at the optical switch on the basis of the position information of the pixel and a time when a region corresponding to the pixel is brought into an on-state.

In the optical pulse timing detection method, signal processing can be conducted on the basis of the output of the photo-detector. For example, when signal pulses of a fixed shape are measured with respect to a plurality of pixels on a CCD or a photo-detector array, it becomes possible to detect the existence position of a signal beam pulse with a precision of subpixel by calculating the position of the center of gravity of detected output signals.

(Optical Pulse Timing Adjustment Apparatus)

In order to achieve the object, an optical pulse timing adjustment apparatus includes an optical switch for forming an on-state region at only an irradiated portion thereof when irradiated with a control beam pulse, and transmitting or reflecting incident signal beam pulses at the on-state region so as to spatially switch an optical path for the signal beam pulses, a photo-detector equipped with a plurality of pixels to detect signal beam pulses transmitted or reflected at the on-state region of the optical switch, at a pixel corresponding to the region, a timing computation unit for acquiring position information of a pixel, at which a predetermined signal beam pulse has been detected, on the basis of a result of the detection conducted by the photo-detector, and computing timing of arrival of a predetermined signal beam pulse at the optical switch on the basis of the position information of the pixel and a time when a region corresponding to the pixel is brought into an on-state, and a delay apparatus for delaying subsequent signal beam pulses on the basis of timing computed by the timing computation unit. Timing of arrival of the signal beam pulses at the optical switch is adjusted.

In the optical pulse timing adjustment apparatus according to the invention, subsequent signal beam pulses are delayed by the delay apparatus on the basis of the timing computed by the timing computation unit to adjust the timing of arrival of the signal beam pulses at the optical switch. In this adjustment apparatus, timing fluctuation in the beam pulse or pulse sequence can be detected with a time resolution on the order of femto-seconds by providing the configuration of the optical pulse timing detection apparatus. As a result, timing in the beam pulse or pulse sequence can be adjusted with a time resolution on the order of femto-seconds. Furthermore, since the timing computation unit can compute the timing in real time, the arrival timing can be adjusted in real time on the basis thereof.

In the optical pulse timing adjustment apparatus, the delay apparatus can be formed to delay subsequent signal beam pulses so as to make timing of arrival of the subsequent signal beam pulses at the optical switch become desired timing. Furthermore, as the delay apparatus, a delay apparatus for changing an optical path length to the optical switch for signal beam pulses and thereby delaying subsequent signal beam pulses can be used.

Furthermore, the timing of arrival of each of a plurality of kinds of signal beam pulses at the optical switch can also be adjusted. The optical pulse timing adjustment apparatus can be formed so as to include an optical switch for forming an on-state region on only an irradiated portion when irradiated with a control beam pulse, transmitting or reflecting incident signal beam pulses of a plurality of kinds by the on-state region, and spatially switching optical paths for the signal beam pulses of a plurality of the kinds, a photo-detector equipped with a plurality of pixels to detect signal beam pulses of a plurality of the kinds transmitted or reflected by the on-state region of the optical switch, at a pixel corresponding to the region, a timing computation unit for acquiring position information of a pixel at which a predetermined signal beam pulse has been detected, on the basis of a result of the detection conducted by the photo-detector, and computing timing of arrival of a predetermined signal beam pulse at the optical switch on the basis of the position information of the pixel and time when a region corresponding to the pixel is brought to an on-state, and a plurality of delay apparatuses respectively provided for the kinds of signal beam pulses to delay subsequent signal beam pulses so as to make timing of arrival of signal beam pulses of a plurality of the kinds at the optical switch desired timing, on the basis of timing computed by the timing computation unit.

(Optical Pulse Timing Adjustment Method)

In order to achieve the object, an optical pulse timing adjustment method according to the invention includes the steps of using an optical switch for forming an on-state region at only an irradiated portion thereof when irradiated with a control beam pulse, irradiating the optical switch with a control beam pulse, and transmitting or reflecting incident signal beam pulses by the on-state region so as to spatially switch an optical path for the signal beam pulses, detecting signal beam pulses transmitted or reflected at the on-state region of the optical switch, at a pixel corresponding to the region of a photo-detector equipped with a plurality of pixels, acquiring position information of a pixel at which a predetermined signal beam pulse has been detected, on the basis of a result of the detection conducted by the photo-detector, computing timing of arrival of a predetermined signal beam pulse at the optical switch on the basis of the position information of the pixel and a time when a region corresponding to the pixel is brought into an on-state, and delaying subsequent signal beam pulses on the basis of the computed timing so as to thereby adjust timing of arrival of the signal beam pulses at the optical switch.

In the optical pulse timing adjustment method, signal processing can be conducted on the basis of the output of the photo-detector. For example, when signal pulses of a fixed shape are measured with respect to a plurality of pixels on a CCD or a photo-detector array, it becomes possible to detect the existence position of a signal beam pulse with a precision of subpixel by calculating the position of the center of gravity of detected output signals.

The optical pulse timing detection method according to the invention can also be used in an optical pulse measurement apparatus based on comparison of laser pulses and an optical pulse measurement apparatus using a fast optical oscilloscope.

BRIEF DESCRIPTION OF THE DRAWINGS

FIG. 5 is a diagram showing a configuration of a timing detection apparatus according to a second embodiment.

DETAILED DESCRIPTION OF THE INVENTION

Hereafter, examples of the present invention will be described in detail with reference to the drawings.

FIRST EMBODIMENT

[Configuration of Timing Detection Apparatus]

Figure 1:
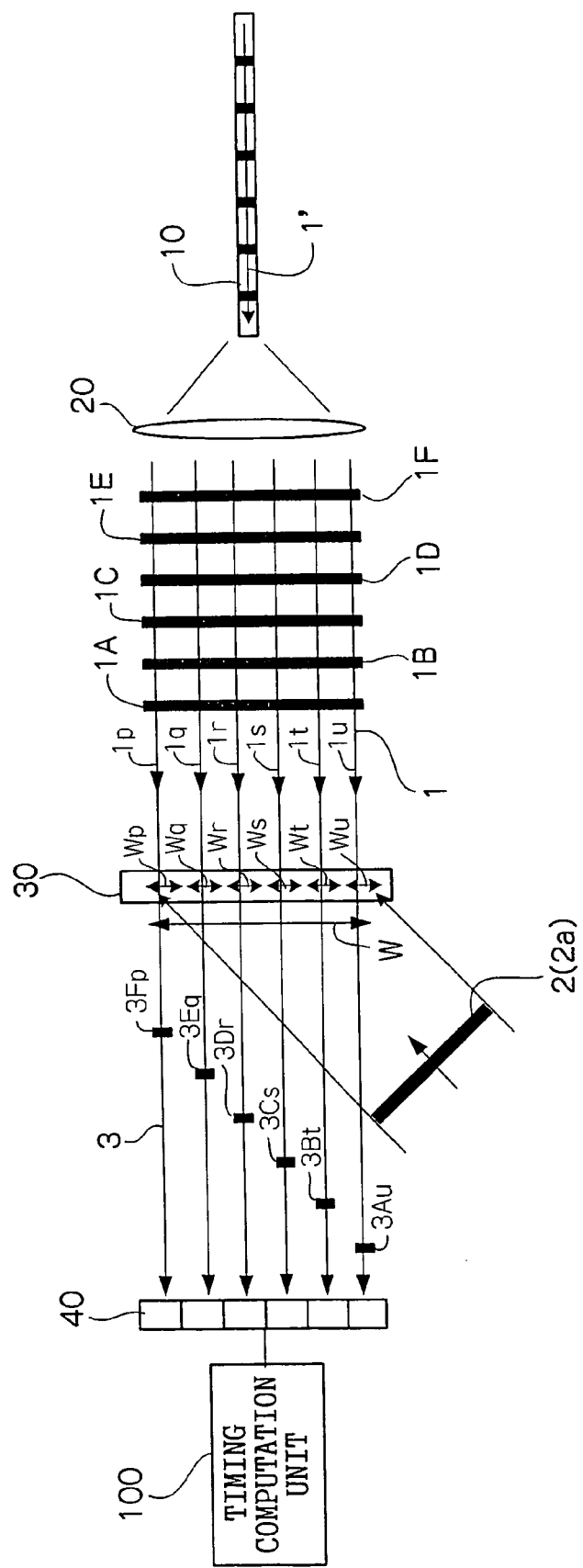
FIG. 1 is a diagram showing a configuration of a timing detection apparatus according to a first embodiment.

As shown in FIG. 1, a timing detection apparatus according to a first embodiment includes an optical waveguide 10, such as an optical fiber, for transmitting a signal beam 1', an optical system 20 for expanding the signal beam 1' emitted from the optical waveguide 10 and thereby obtaining a signal beam 1 composed of a sequence of signal beam pulses 1A to 1F, an optical switch 30 of transmission type equipped with a plurality of regions Wp to Wu functioning as mutually independent optical shutter sections to extract output optical pulses 3Au to 3Fp (an output beam 3) from the signal beam 1 by on/off operation of the optical shutter sections caused by irradiation of a control beam 2, a photo-detector 40 for detecting for detecting the output beam 3 output from the optical switch 30, and a timing computation unit 100 for conducting computation to find timing of arrival of the signal beam pulses 1A to 1F at the optical switch 30 on the basis of a result of detection supplied from the photo-detector 40.

The signal beam 1' transmitted in the optical waveguide 10 such as optical fiber is obtained by multiplexing signal beams of a plurality of channels (six channels in FIG. 1) into a time serial stream having a bit rate of 1 tera bit/second (Tbit/second) and a pulse time interval of 1 ps.

The optical system 20 is formed by combining a plurality of lenses. The optical system 20 converts the incident signal beam 1' to the signal beam 1 formed of the signal beam pulses 1A to 1F and having a wave surface spread in a surface direction perpendicular to the travel direction. Since the time interval between the signal beam pulses is 1 ps, the spatial distance interval becomes 300 μm.

The optical switch 30 of transmission type is formed in a strip form and disposed so that its length direction will become perpendicular to the travel direction of the signal beam 1. According to this disposition, the signal beam 1 having a spread of a predetermined width W in the length direction is incident on the optical switch 30 over the predetermined width W, and in addition the control beam 2 is inclined in travel direction to the length direction of the optical switch 30 and incident on the optical switch 30 over the predetermined width W. Although in FIG. 1 the control beam 2 is incident on the optical switch 30 from the output side of the signal beam 1, the control beam 2 may also be incident on the optical switch 30 from the input side of the signal beam 1.

The control beam 2 is a beam spread in wave surface in a plane direction perpendicular to the travel direction in the same way as the signal beam 1. The control beam 2 is formed of a pulse sequence including one control beam pulse 2a per a set of the signal beam pulses 1A to 1F. Furthermore, the control beam 2 is synchronized to the signal beam 1. Information indicating the beginning of the sequence of the signal beam pulses 1A to 1F is inserted in the signal beam 1'. From the information, the control beam 2 synchronized to the signal beam 1 with a predetermined time relation to the signal beam 1 can be formed.

Furthermore, the regions Wp to Wu of the optical switch 30 are formed of a nonlinear optical material that changes in absorption coefficient (absorbance) according to whether the control beam 2 is radiated thereto and that is short in relaxation time. The regions Wp to Wu function as the optical shutter sections, which change in transmittance and transmit the signal beam 1 at transmittance of at least a predetermined value only during the moment the control beam 2 is radiated thereto. In other words, the optical switch 30 conducts on/off operation by utilizing oversaturated absorption of the nonlinear optical material. It is not necessary that the on/off operation of the optical switch 30 is in synchronization with all signal beam pulses, but it suffices that on/off operation of the optical switch 30 is in synchronism with a signal beam pulse selected as occasion demands. A detailed structure of the optical switch 30 will be described later.

The photo-detector 40 includes photo-detection elements such as a CCD camera or a photo-detector array including a large number of pixels arranged in a one-dimensional array form or a two-dimensional array form, or spot beam position sensors (position sensitive diodes) utilizing the surface resistance of photo-diodes. The photo-detector 40 is disposed so that pixels will be positioned on optical paths for spatial position portions 1*p* to 1*u* of the signal beam 1.

The timing computation unit 100 is formed of an ordinary personal computer having a CPU, a ROM, a RAM, and an input-output unit.

[Shutter Function of Optical Switch]

Figure 2A:
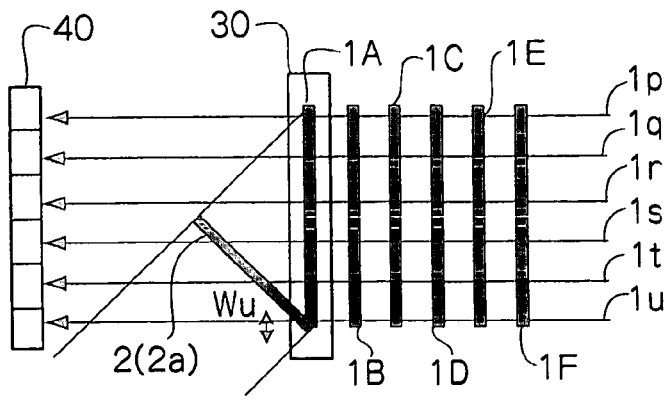
FIGS. 2A to 2D are diagrams showing a shutter function of an optical switch in a timing detection apparatus shown in FIG. 1.

A shutter function of the optical switch 30 will now be described. In the apparatus shown in FIG. 1, the control beam 2 is synchronized to the signal beam 1 so as to cause the control beam pulse 2*a* arrive at a region Wu of the optical switch 30 at a point of time at which the signal beam pulse 1A arrives at the optical switch 30 as shown in FIG. 2A. At a point of time at which the signal beam pulse 1A arrives at the optical switch 30, therefore, the region Wu of the optical switch 30 is brought to a transmission state and the spatial position portion 1*u* of the signal beam pulse 1A transmits through the region Wu and extracted out as an output beam pulse 3Au as shown in FIG. 2B.

Figure 2B:
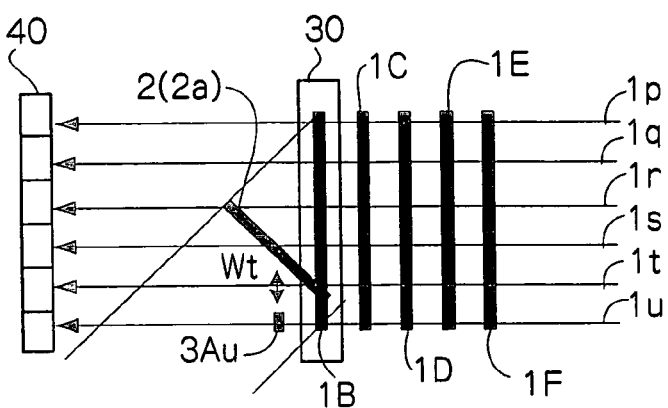
Figure 2C:
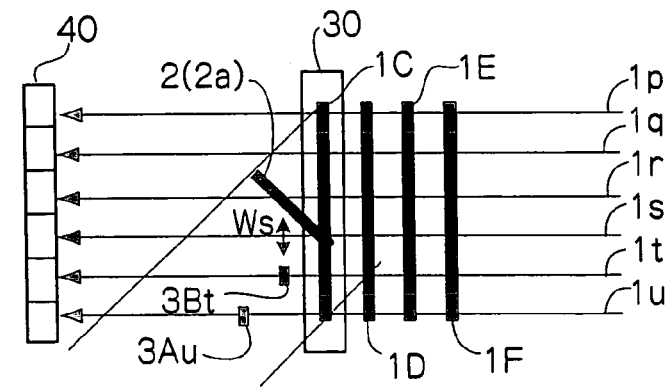

If the signal beam pulse 1B subsequently arrives at the optical switch 30 as shown in FIG. 2B, the control beam pulse 2*a* arrives at the region Wt of the optical switch 30 and the region Wt is brought to the transmission state and a spatial position portion 1*t* of the signal beam pulse 1B is transmitted through the region Wt and extracted as an output beam pulse 3Bt as shown in FIG. 2C.

If the signal beam pulse 1C subsequently arrives at the optical switch 30 as shown in FIG. 2C, the control beam pulse 2*a* arrives at the region Ws of the optical switch 30 and the region Ws is brought to the transmission state and a spatial position portion 1*s* of the signal beam pulse 1C is transmitted through the region Ws and extracted as an output beam pulse 3Cs as shown in FIG. 1.

In this way, the spatial position portion 1*u* of the signal beam pulse 1A, the spatial position portion 1*t* of the signal beam pulse 1B, the spatial position portion *s* of the signal beam pulse 1C, a spatial position portion 1*r* of the signal beam pulse 1D, a spatial position portion 1*q* of the signal beam pulse 1E, and a spatial position portion 1*p* of the signal beam pulse 1F are extracted successively as the output beam pulses 3Au, 3Bt and 3Cs and output beam pulses 3Dr, 3Eq and 3Fp, respectively, and the output beam pulses 3Au to 3Fp are detected successively at corresponding pixels in the photo-detector 40, respectively.

Figure 2D:
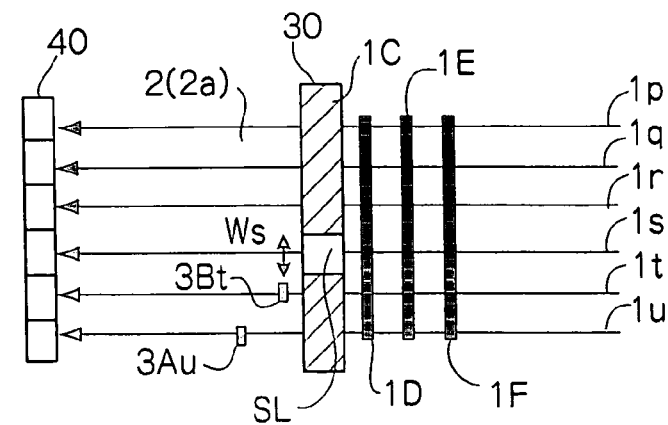

In other words, in this optical switch 30, the regions Wp to Wu of the optical switch 30 successively cross the control beam and are brought to the transmission state, as if a slit portion SL moves in the length direction of the optical switch 30 as the control beam 2 propagates as shown in FIG. 2D. And a spatial position portion corresponding to a region that assumes the transmission state when the signal beam pulse 1A to 1F arrives at the optical switch 30 is extracted.

[Specific Example of Optical Switch of Transmission Type]

A specific example of the optical switch 30 will now be described. The inventors earlier proposed an all-optical switch of plane type using an organic dye film (JP-A No. 11-15031). This all-optical switch can be used preferably as the optical switch 30.

Figure 3:
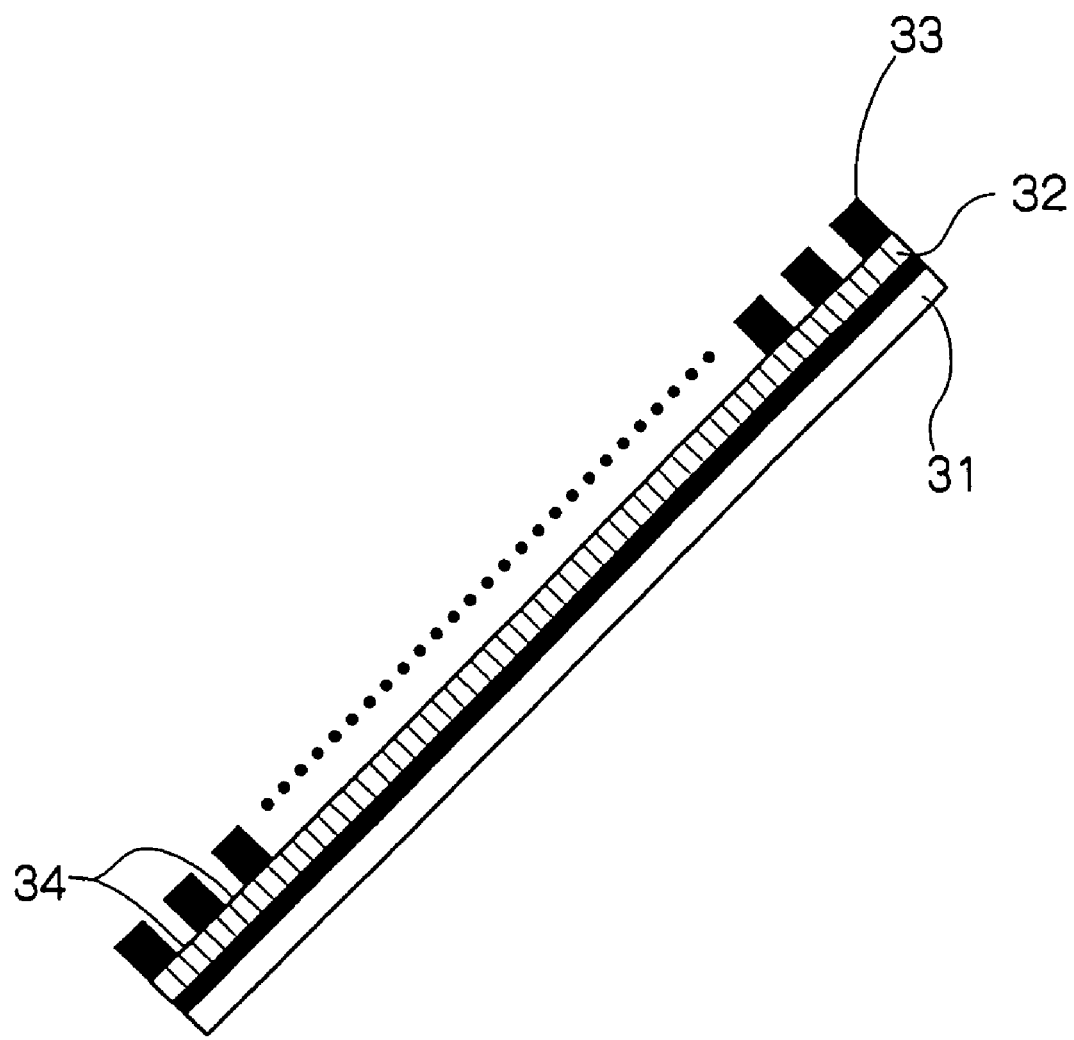
FIG. 3 is a sectional view showing a specific configuration of an optical switch of transmission type.

This all-optical switch is shown in FIG. 3. A functional thin film 32 exhibiting saturable absorption on the order of femto-seconds is formed on a silica (quartz) substrate 31. A shading layer 33 is formed on the functional thin film 32 in a predetermined pattern by aluminum evaporation and etching. Portions 34 on the functional thin film 32, which are not covered by the shading layer 33, are made to function as a plurality of mutually independent optical shutter sections.

As the functional thin film 32, $\pi$ conjugate macromolecules, such as AlPo—F (Fluoro-aluminum phthalocyanine), polydiacetylene or polythiophene, dye-associated substance such as squarylium, a C60 thin film, or the like can be used. By forming the functional thin film 32 of the organic material, the film thickness control is facilitated and it becomes possible to increase the area of the optical switches. Among them, a dye molecule film of the squarylium dye is favorable. As for the dye molecule film of the squarylium dye, switching operation can be conducted efficiently by using its J-aggregate substance.

A manufacturing method for the optical switch is described in JP-A No. 11-15031.

[Operation of Timing Detection Apparatus]

Operation of the timing detection apparatus will now be described.

The signal beam 1 is incident on the optical switch 30 over the predetermined width W, and in addition the control beam 2 is inclined in travel direction to the length direction of the optical switch 30 and incident on the optical switch 30 over the predetermined width W.

In order to spatially separate and extract the signal beam pulses 1A to 1F respectively from only corresponding regions Wu to Wp of the optical switch 30, such as the signal beam pulse 1A from only the region Wu and the signal beam pulse 1B from only the region Wt, however, the difference in time of arrival of the control beam pulse 2*a* at the regions Wu to Wp caused by the inclination of the spread wave surface of the control beam 2 to the optical switch 30 is made equal to the time interval between signal beam pulses. In addition, the time width of the control beam pulse 2*a* is made sufficiently shorter than the time interval between signal beam pulses.

As described above, the spatial position portion 1*u* of the signal beam pulse 1A, the spatial position portion 1*t* of the signal beam pulse 1B, the spatial position portion 1*s* of the signal beam pulse 1C, the spatial position portion 1*r* of the signal beam pulse 1D, the spatial position portion 1*q* of the signal beam pulse 1E and the spatial position portion 1*p* of the signal beam pulse 1F are extracted successively as the output beam pulses 3Au, 3Bt and 3Cs, 3Dr, 3Eq and 3Fp, respectively.

Subsequently, the output beam pulses 3Au to 3Fp are detected successively at corresponding pixels in the photo-detector 40, respectively. The photo-detector 40 outputs position information of pixels at which the output beam pulses 3Au to 3Fp have been detected, respectively, to the timing computation unit 100.

Subsequently, the timing computation unit 100 calculates position coordinates of the pixels at which the output beam pulses 3Au to 3Fp have been detected, respectively, on the basis of input position information. As already described, pixels of the photo-detector 40 are disposed so as to be positioned on optical paths for the spatial position portions 1*p* to 1*u* of the signal beam 1. It is possible to specify the position (slit position) in which the signal beam 1 has passed through the optical switch 30, on the basis of position coordinates of the pixels at which the output beam pulses 3Au to 3Fp have been detected. On the basis of this relation, the timing computation unit 100 computes timing of arrival of the signal beam pulses 1A to 1F respectively at the corresponding regions Wu to Wp of the optical switch 30. In other words, beam pulse timing (time difference in the pulse sequence) of the signal beam 1 is detected.

As the photo-detector for detecting a spatial position, a CCD or a photo-detector array is used. When a signal beam pulse is detected so as to extend over a plurality of pixels, computation for detecting the center of gravity is conducted on the basis of the amount of light detected at the pixels. As a result, the pulse arrival timing can be detected with a resolution that is finer than the spatial resolution of the photo-detector.

[Computation of Timing]

Figure 4:
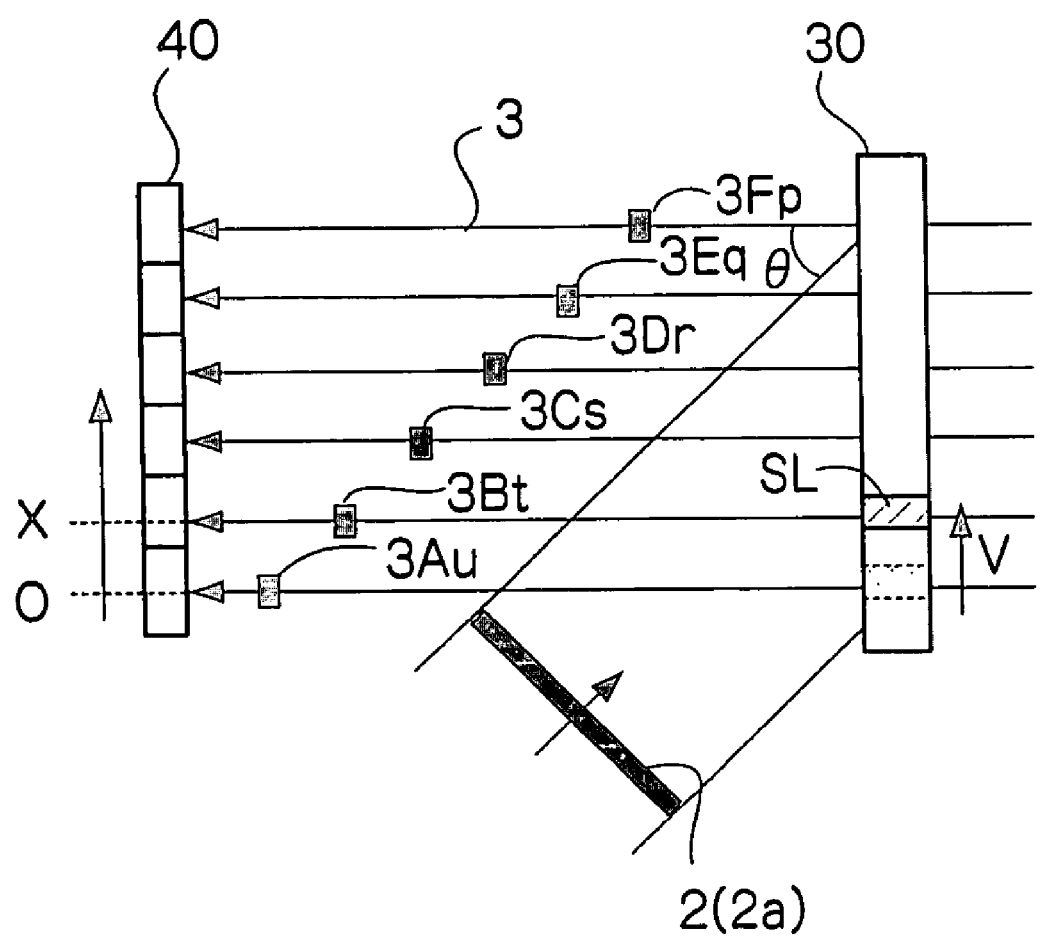
FIG. 4 is a diagram showing a timing computation method.

A timing computation method executed in the timing computation unit 100 will now be described with reference to FIG. 4.

Letting position coordinates of a pixel at which the first output beam pulse 3Au has been detected in the photo-detector 40 be an origin, position coordinates of a pixel at which the next output beam pulse 3Bt has been detected be X(m), and a travel velocity of the slit SL be V(m/sec), time t between the arrival of the signal beam pulse 1A at the optical switch 30 and the arrival of the next signal beam pulse 1B is represented by the following equation.

$$t = \frac{X}{V} \text{ [sec]}$$

Denoting the irradiation angle (incidence angle) of the control beam 2 by θ and the light velocity by c (m/sec), the travel velocity V of the slit SL is represented by the following equation. As appreciated from this equation, the time resolution in timing detection can be further adjusted by suitably changing the irradiation angle θ of the control beam.

$$V = \frac{c}{\sin \theta} \text{ [m/sec]}$$

Therefore, the time t is represented by the following equation.

$$t = \frac{X \sin \theta}{c} \text{ [sec]}$$

In other words, the arrival time difference between beam pulses of the signal beam 1 is converted to a difference in pixel position coordinates in the photo-detector 40 by the slit SL. Conversely, therefore, the arrival time difference between beam pulses of the signal beam 1 can be found from the position information obtained by the photo-detector 40. As described above, the optical shutter sections of the optical switch 30 can be made to conduct the on/off operation according to the control beam pulses on the order of femto-seconds. Therefore, the arrival time difference between beam pulses of the signal beam 1 can be found with a time resolution on the order of femto-seconds. Thus, even in the case where timing fluctuation occurs in an optical pulse or a pulse sequence, the timing fluctuation can be detected with a time resolution on the order of femto-seconds. Furthermore, since a complicated computation is not performed, the timing fluctuation can be detected in real time.

By the way, the width of the slit SL is determined on the basis of the irradiation angle and time width of the control beam and the optical pulse or the pulse sequence, and the on/off velocity of the switches.

SECOND EMBODIMENT

General Configuration of Timing Detection Apparatus

In a timing detection apparatus according to a second embodiment, an optical switch 30 of transmission type is disposed with its length direction inclined at a predetermined angle (45° in FIG. 5) to the travel direction of the signal beam 1 as shown in FIG. 5. By this disposition, the control beam 2 having spread of a predetermined width W in the length direction of the optical switch 30 is incident on the optical switch 30 perpendicularly over the predetermined width W, and in addition the signal beam 1 with its travel direction inclined to the length direction of the optical switch 30 is incident on the optical switch 30 over the predetermined width W.

Although the control beam 2 is incident on the optical switch 30 from the output side of the signal beam 1 in FIG. 5, the control beam 2 may be incident on the optical switch 30 from the incidence side of the signal beam 1. The same components as those in the first embodiment are denoted by like reference numerals, and description thereof will be omitted.

[Shutter Function of Optical Switch]

A shutter function of the optical switch 30 will now be described. In the apparatus shown in FIG. 5, the optical switch 30 of transmission type including a plurality of regions Wp to Wu, which function as mutually independent optical shutter sections, is used in the same way as the first embodiment. However, since the control beam 2 is incident perpendicularly on the optical switch 30, the regions Wp to Wu are simultaneously brought to the transmission state.

Figure 6A:
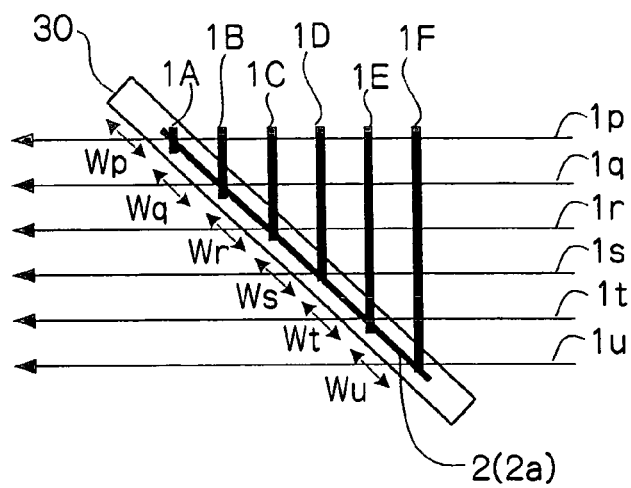
FIGS. 6A to 6C are diagrams showing a shutter function of an optical switch in a timing detection apparatus shown in FIG. 5.

As shown in FIG. 6A, the control beam pulse 2a is radiated simultaneously to the regions Wp to Wu of the optical switch 30 to bring the regions Wp to Wu simultaneously to the transmission state. And the control beam 2 is synchronized to the signal beam 1 so as to cause the control beam pulse 2a to arrive at the regions Wp to Wu of the optical switch 30 at a point of time at which the signal beam pulses 1A to 1F simultaneously arrive at the corresponding regions Wp to Wu of the optical switch 30, respectively, as shown in FIG. 6A.

Figure 6B:
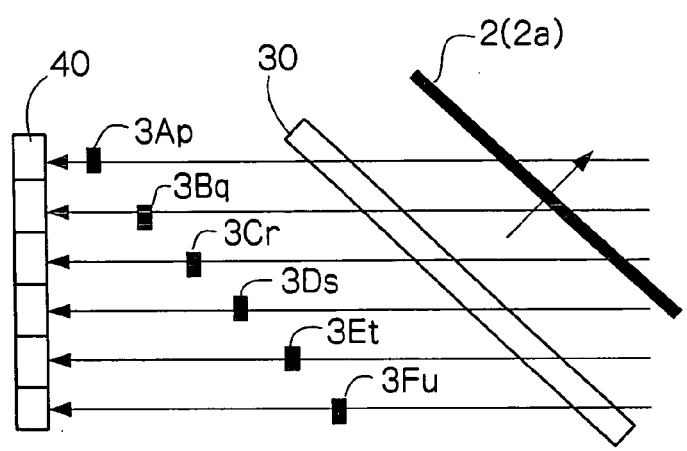

At a point of time at which the control beam pulse 2a has arrived at the regions Wp to Wu of the optical switch 30, therefore, a spatial position portion 1p of the signal beam pulse 1A, a spatial position portion 1q of the signal beam pulse 1B, a spatial position portion 1r of the signal beam pulse 1C, a spatial position portion 1s of the signal beam pulse 1D, a spatial position portion 1t of the signal beam pulse 1E and a spatial position portion 1u of the signal beam pulse 1F are transmitted respectively through the region Wp, the region Wq, the region Wr, the region Ws, the region Wt and the region Wu, and are extracted respectively as output beam pulses 3Ap, 3Bq, 3Cr, 3Ds, 3Et and 3Fu as shown in FIG. 6B. And the output beam pulses 3Ap to 3Fu are detected respectively at the corresponding pixels of the photo-detector 40.

In other words, in this optical switch 30, the regions Wp to Wu of the optical switch 30 simultaneously cross the control beam 2 and are brought to the transmission state. When the regions Wp to Wu have assumed the transmission state, respective spatial position portions of the signal beam pulses 1A to 1F arriving at the optical switch 30 are extracted.

Figure 6C:
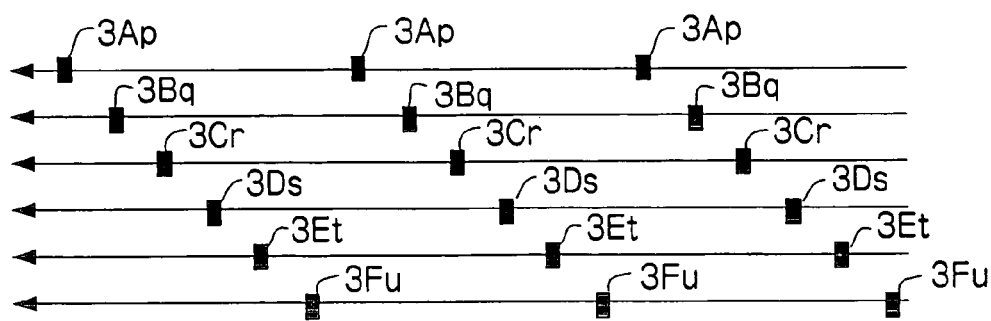

Although some sets are omitted in FIGS. 5, 6A and 6B, sets each including the signal beam pulses 1A to 1F continue serially in the signal beam 1, and sets each including the output beam pulses 3Ap to 3Fu are extracted consecutively from the optical switch 30 as shown in FIG. 6C. However, FIG. 6C shows a spatial position relation of the output beam pulses 3Ap to 3Fu. Viewed from the standpoint of time, a set of the output beam pulses 3Ap to 3Fu is extracted simultaneously. In the case where N=6, the next set of the output beam pulses 3Ap to 3Fu is extracted simultaneously, six times the time interval between signal beam pulses later.

[Operation of Timing Detection Apparatus]

Operation of the timing detection apparatus will now be described.

The control beam 2 is perpendicularly incident on the optical switch 30 over the predetermined width W, and in addition the signal beam 1 is inclined in travel direction to the length direction of the optical switch 30 and incident on the optical switch 30 over the predetermined width W.

However, in order to spatially separate and extract the signal beam pulses 1A to 1F respectively from only corresponding regions Wp to Wu of the optical switch 30, such as the signal beam pulse 1A from only the region Wp and the signal beam pulse 1B from only the region Wq, the time width of the control beam pulse 2a is made sufficiently shorter than the difference in time of arrival of the spatial position portions 1p to 1u respectively corresponding to the regions Wp to Wu in the spread wave surface direction of the signal beam 1, at the regions Wp to Wu caused by differences in optical path length to the regions Wp to Wu.

In other words, in the case where the optical switch 30 is inclined at 45° to the signal beam 1 as shown in FIG. 5, the time width of the control beam pulse 2a is made sufficiently shorter than the time interval between signal beam pulses. In other words, the optical shutter sections of the optical switch 30 are opened and closed with minute time intervals. For example, if the time width of the signal beam pulse is 100 fs (femto-second), which is equal to one tenth of the time interval (1 ps), then the time width of the control beam pulse 2a should be made nearly equal to or slightly shorter than that of the signal beam pulse.

As described above, the spatial position portion 1p of the signal beam pulse 1A, the spatial position portion 1q of the signal beam pulse 1B, the spatial position portion 1r of the signal beam pulse 1C, the spatial position portion 1s of the signal beam pulse 1D, the spatial position portion 1t of the signal beam pulse 1E and the spatial position portion 1u of the signal beam pulse 1F are extracted successively as the output beam pulses 3Ap, 3Bq, 3Cr, 3Ds, 3Et and 3Fu, respectively.

Subsequently, the output beam pulses 3Ap to 3Fu are detected successively at corresponding pixels in the photo-detector 40, respectively. The photo-detector 40 outputs position information of pixels at which the output beam pulses 3Ap to 3Fu have been detected, respectively, to the timing computation unit 100.

Subsequently, the timing computation unit 100 calculates position coordinates of the pixels at which the output beam pulses 3Ap to 3Fu have been detected, respectively, on the basis of input position information. As already described, pixels of the photo-detector 40 are disposed so as to be positioned on optical paths for the spatial position portions 1p to 1u of the signal beam 1. It is possible to specify the position in which the signal beam 1 has passed through the optical switch 30, on the basis of position coordinates of the pixels at which the output beam pulses 3Ap to 3Fu have been detected. On the basis of this relation, the timing computation unit 100 computes timing of arrival of the signal beam pulses 1A to 1F respectively at the corresponding regions Wp to Wu of the optical switch 30. In other words, beam pulse timing (time difference in the pulse sequence) of the signal beam 1 is detected.

[Computation of Timing]

Figure 7A:
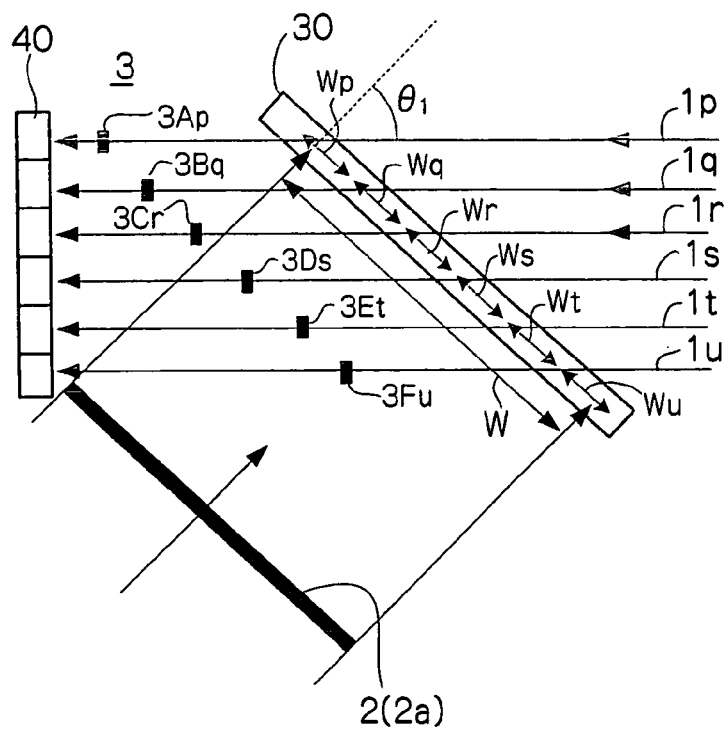
FIGS. 7A and 7B are diagrams showing a timing computation method.
Figure 7B:
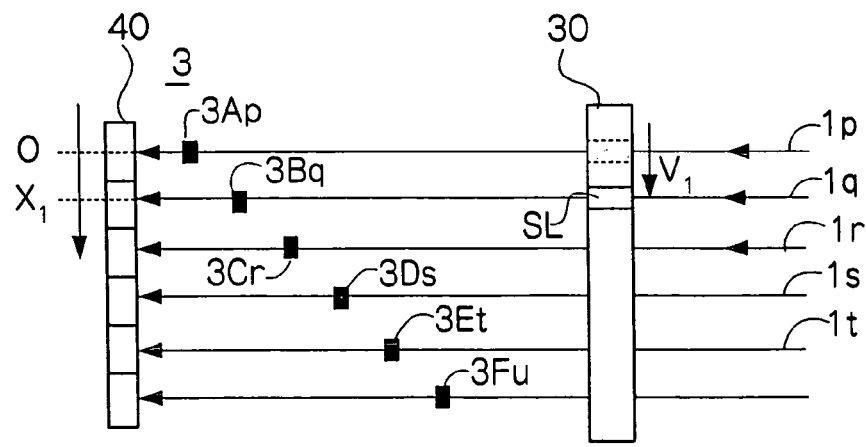

A timing computation method executed in the timing computation unit 100 will now be described with reference to FIGS. 7A and 7B.

The regions Wp to Wu arranged in the length direction of the optical switch 30 simultaneously cross the control beam 2 and are brought to the transmission state. This shutter operation is equivalent to the case where the slit portion SL moves in a direction perpendicular to the travel direction of the signal beam 1 as shown in FIG. 7B. Denoting the incidence angle of the signal beam 1 to the optical switch 30 (i.e., the inclination angle of the optical switch 30) by $\theta 1$ and the light velocity by c (m/sec), the travel velocity V1 of the slit SL is represented by the following equation.

$$V_1 = \frac{c}{\tan \theta_1} \text{ [m/sec]}$$

As appreciated from this equation, the time resolution in timing detection can be adjusted by suitably changing the inclination angle $\theta 1$ of the optical switch 30.

Letting position coordinates of a pixel at which the first output beam pulse 3Ap has been detected in the photo-detector 40 be an origin, and position coordinates of a pixel at which the next output beam pulse 3Bq has been detected be X1 (m), a pulse interval t1 between the signal beam pulse 1A and the signal beam pulse 1B is represented by the following equation.

$$t_1 = \frac{X_1 \tan \theta_1}{c} \text{ [sec]}$$

In other words, the arrival time difference between beam pulses of the signal beam 1 is converted to a difference in pixel position coordinates in the photo-detector 40 by the slit SL. Conversely, therefore, the arrival time difference between beam pulses of the signal beam 1 can be found from the position information obtained by the photo-detector 40. As described above, the optical shutter sections of the optical switch 30 can be made to conduct the on/off operation according to the control beam pulses on the order of femto-seconds. Therefore, the pulse interval of the beam pulse sequence of the signal beam 1 can be found with a time resolution on the order of femto-seconds. Therefore, even in the case where timing fluctuation occurs in an optical pulse or a pulse sequence, therefore, the timing fluctuation can be detected with a time resolution on the order of femto-seconds. Furthermore, since a complicated computation is not performed, the timing fluctuation can be detected in real time.

Hereafter, variants of the embodiments will be described.

[Apparatus having Optical Switch of Reflection Type]

In the embodiments, examples using the optical switch of transmission type have been described. As hereafter described, however, an optical switch of reflection type can also be used.

Figure 8:
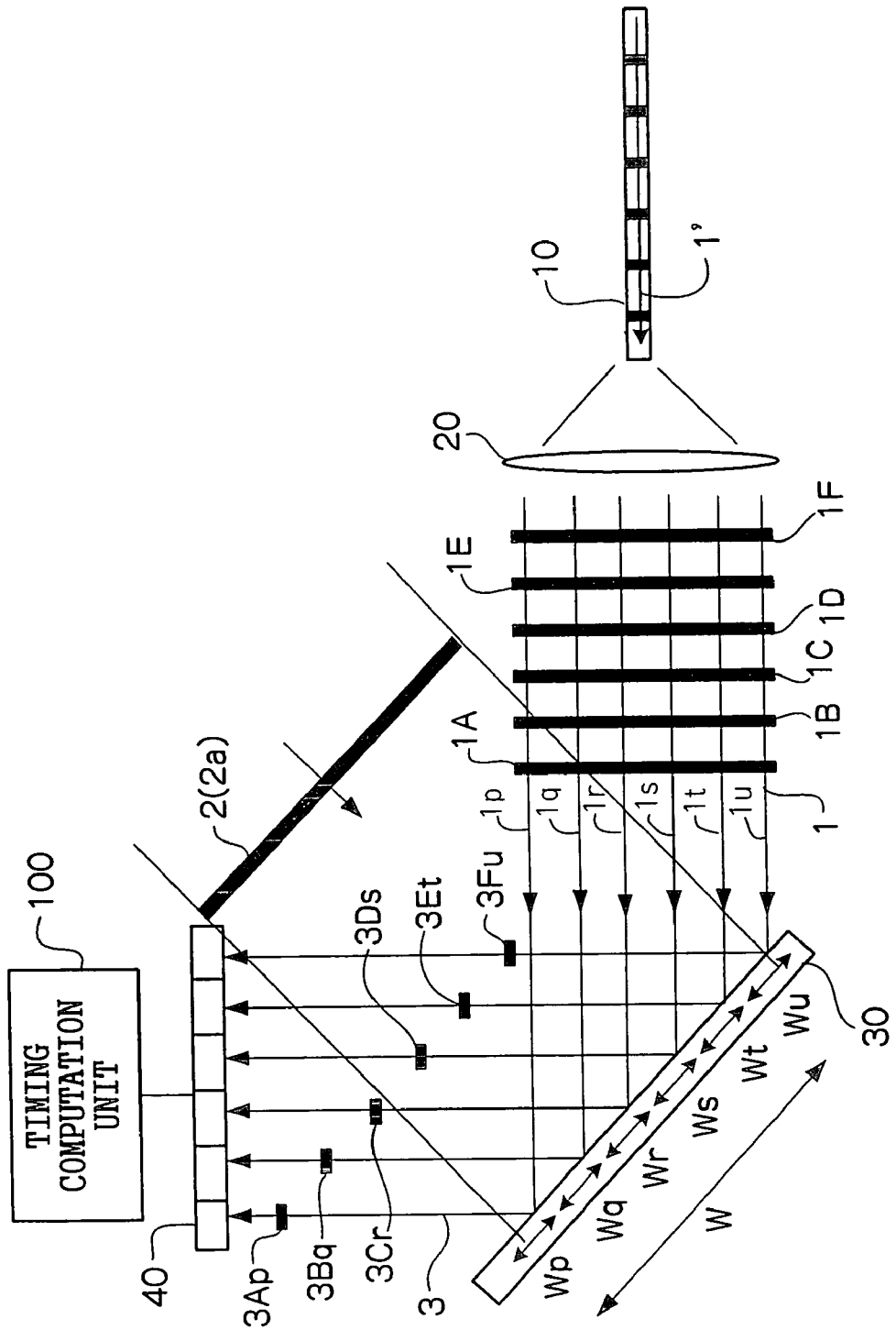
FIG. 8 is a diagram showing an example of a timing detection apparatus using an optical switch of reflection type.

For example, a signal beam is obliquely incident on an optical switch of reflection type, and a control beam is incident perpendicularly on the optical switch as shown in FIG. 8. In this example, an optical switch 30 has a length direction inclined at 45° to the travel direction of a signal beam 1, and it is disposed on an optical path of the signal beam 1, in the same way as the second embodiment. The optical switch 30 of reflection type is formed of a nonlinear optical material whose refractive index changes according to whether or not a control beam 2 is radiated thereto, and whose relaxation time is short. Only during the moment at which the control beam 2 is radiated thereto, the optical switch 30 is brought to the reflection state by interference and reflects the signal beam 1 with an index of reflection that is equal to at least a predetermined value. In a position of the signal beam 1 after it has been reflected by the optical switch 30, a photo-detector 40 having a large number of pixels arranged in a one-dimensional form or a two-dimensional form is disposed so as to receive reflected beams from spatial position portions $1p$ to $1u$ of the signal beam 1 at its pixels. Remaining components are the same as those in the second embodiment, and consequently the same components are denoted by like reference numerals and description thereof will be omitted.

Figure 9A:
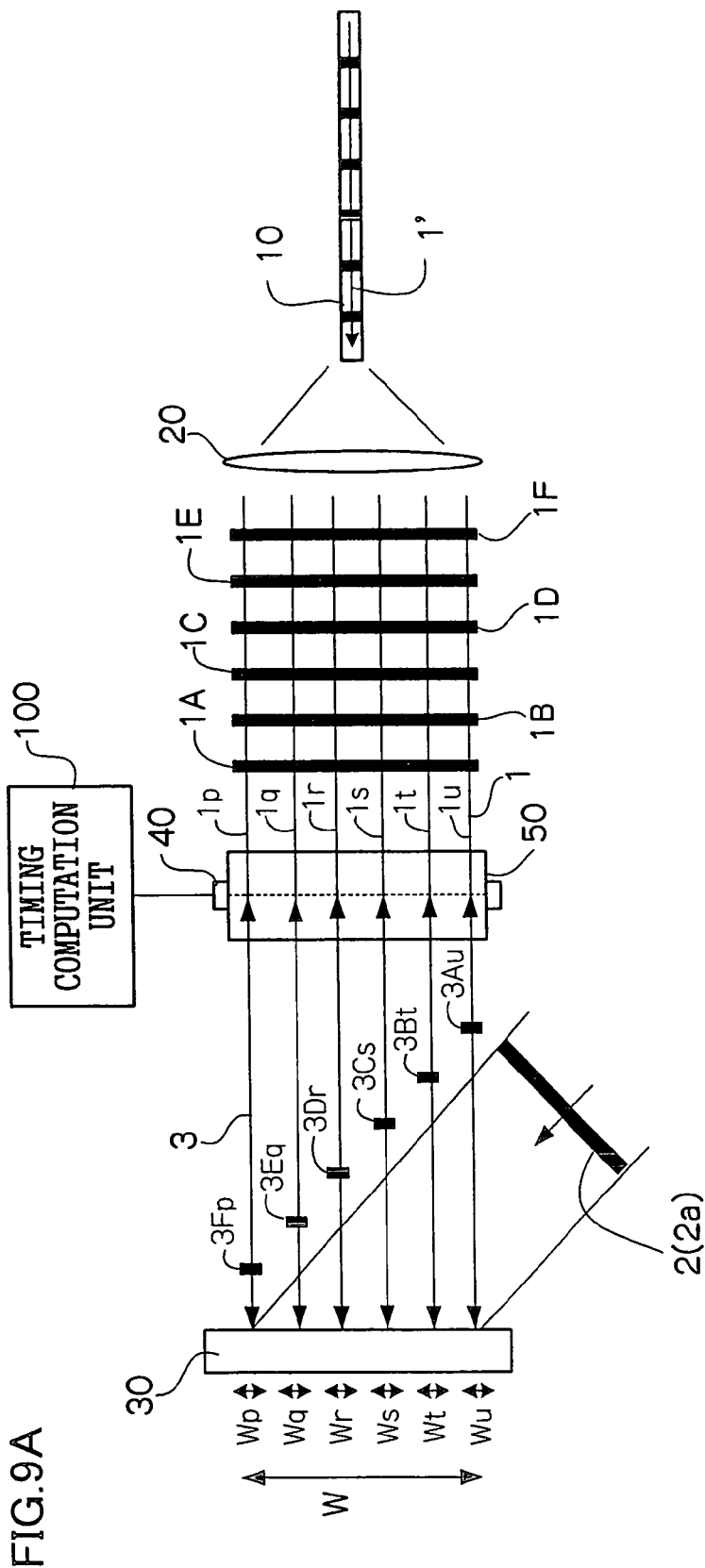
FIGS. 9A and 9B are diagrams showing another example of a timing detection apparatus using an optical switch of reflection type.
Figure 9B:
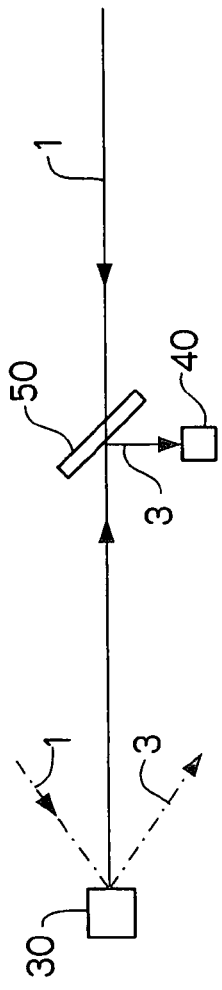

Alternatively, for example, a signal beam is incident perpendicularly on the optical switch of reflection type and a control beam is incident obliquely on the optical switch, as shown in FIGS. 9A and 9B. FIGS. 9A and 9B are diagrams seen from directions perpendicular to each other. In this example, the length direction of the optical switch 30 is made perpendicular to the travel direction of the signal beam 1 and the optical switch 30 is disposed on the optical path of the signal beam 1 in the same way as the first embodiment. However, the optical switch 30 is an optical switch of reflection type, and the signal beam 1 is incident on a reflection surface side of the optical switch 30 via a half mirror 50. In addition, the travel direction of the control beam 2 is inclined to the length direction of the optical switch 30, and the control beam 2 is incident on the optical switch 30 from the reflection surface side of the optical switch 30. In a position of the signal beam 1 after it has been reflected by the optical switch 30 and further reflected by the half mirror 50, the photo-detector 40 is disposed so as to receive reflected beams from spatial position portions $1u$ to $1p$ of the signal beam 1 at its pixels. Remaining components are the same as those in the first embodiment, and consequently the same components are denoted by like reference numerals and description thereof will be omitted.

By the way, an angle may also be provided between the signal beam 1 incident on the optical switch 30 and an output beam 3 reflected by the optical switch 30 as represented by dotted lines in FIG. 9B without using the half mirror 50.

[Shutter Array]

In the above-described embodiment, an example, in which a strip-shaped optical switch having a plurality of regions functioning as optical shutter sections arranged in a one-dimensional form in the length direction is used, has been described. However, it is also possible to use an optical switch (shutter array) having a plurality of regions functioning as optical shutter sections arranged in a two-dimensional form. In this case, it is necessary to vary the open-close timing of each optical shutter section according to its spatial position in the shutter array. For example, by radiating the control beam modulated by a space modulation element to the optical switch, the optical shutter sections can be made different from each other in open-close timing.

[Switch using Kerr Effect]

In the above-described embodiments, an example, in which an optical switch that conducts on/off operation by using supersaturated absorption of a nonlinear optical material, has been described. However, it is also possible to use an optical switch that conducts on/off operation by using the optical Kerr effect whereby the plane of polarization is rotated according to the control beam, as described in JP-A No. 2002-258333. In this case, background noise in the one-dimensional photo-detector can be suppressed by disposing polarizers behind and in front of the optical switch so as to be perpendicular to each other.

[Position Information Extraction from Image subjected to Image Processing]

In the above-described embodiments, an example, in which the position information of a pixel at which an output beam has been detected is input from the photo-detector directly to the timing computation unit and beam pulse timing is computed, has been described. However, in such a situation that a signal beam pulse is received over a plurality of pixels of the photo-detector, it is also possible to extract the position information of an output beam by conducting signal processing such as detection of the center of gravity on the basis of an output signal of each pixel, and compute the beam pulse timing on the basis of the extracted position information. As a result, the output signal timing can be detected with a subpixel resolution.

[Image Forming Magnification]

In the above-described embodiments, an example, in which the output beam from the optical switch is input to the photo-detector without being passed through the optical system, has been described. However, it is also possible to dispose an expansion optical system or a compression optical system between the optical switch and the photo-detector. The time resolution and dynamic range of timing detection can be changed by changing the magnification for the detected coordinates in the photo-detector. For example, in the case where an optical system having an image forming magnification of n is installed between the optical switch and the photo-detector, the resolution "a" of the photo-detector is changed to a/n.

EXAMPLES

Hereafter, the invention will be described in more detail with reference to specific examples.

Example 1

In this example, a timing adjustment apparatus is formed by using the timing detection apparatus having the configuration shown in FIG. 1, and the arrival timing of signal beam pulses that are beam pulses to be detected is adjusted.

Figure 10:
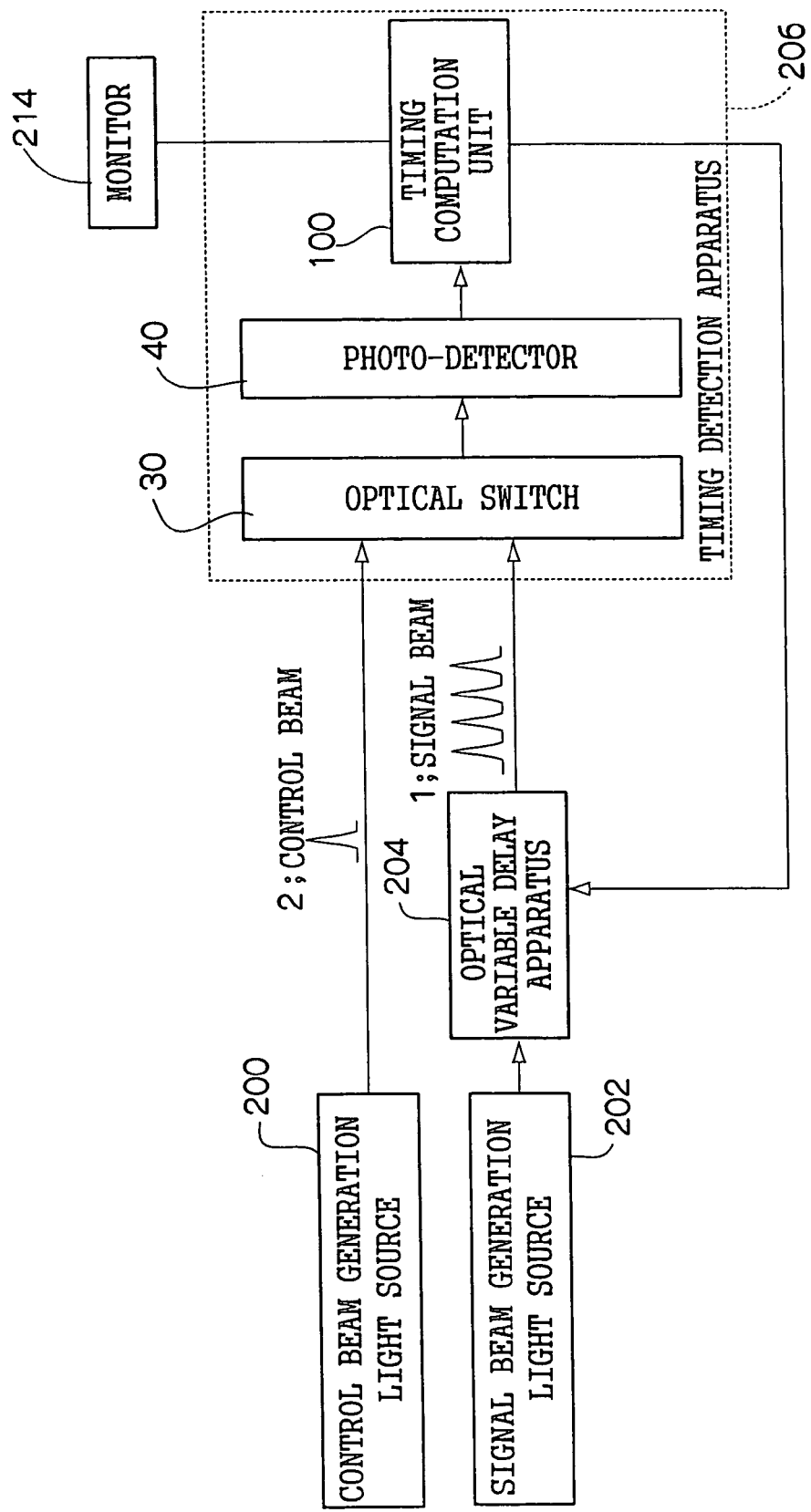
FIG. 10 is a diagram showing a configuration of a timing adjustment apparatus according to a first example.

As shown in FIG. 10, this timing adjustment apparatus includes a control beam generation light source 200 for generating a pulse sequence of a control beam 2, a signal beam generation light source 202 for generating a pulse sequence of a signal beam 1, and a timing detection apparatus 206 for detecting arrival timing of the pulse sequence of a signal beam 1. As described above, the timing detection apparatus 206 includes an optical switch 30, a photo-detector 40 for detecting output beams output from the optical switch 30, and a timing computation unit 100 for computing the timing of arrival of signal beam pulses at the optical switch 30 on the basis of a result of detection conducted in the photo-detector 40.

Between the signal beam generation light source 202 and the optical switch 30, an optical variable delay apparatus 204 for delaying the arrival timing of the pulse sequence of the signal beam 1 on the basis of a computation result (detection result) supplied from the timing computation unit 100 is disposed. A monitor 214 for displaying the computation result is connected to the timing computation unit 100.

In this timing adjustment apparatus, the pulse sequence of the signal beam 1 supplied from the signal beam generation light source 202 is input to the timing detection apparatus 206, and the arrival timing of the beam pulse sequence is computed. The timing detection apparatus 206 inputs a result of the computation to the optical variable delay apparatus 204. The optical variable delay apparatus 204 computes a delay time for compensating the detected arrival timing to obtain desired arrival timing, changes an optical path length between the signal beam generation light source 202 and the optical switch 30 so as to achieve the computed delay time, and thereby adjusts the arrival timing of the beam pulse sequence. By thus feeding back the computation result from the timing detection apparatus 206 to the optical variable delay apparatus 204 as occasion calls, the beam pulse timing can be adjusted in real time.

Changes of pixel position coordinates in the CCD camera obtained when the arrival timing is changed between 0 fs and 700 fs were checked, using a signal beam 1 having a wavelength of 760 nm, average power of 1.4 mW and a pulse width of approximately 100 fs and a control beam 2 having a wavelength of 800 nm, average power of 230 mW, using a pulse width of approximately 100 fs synchronized to the signal beam 1 in the above-described configuration, using squarylium dye J-aggregate substance dye film as a functional thin film of the optical switch 30, and using a CCD camera as the photo-detector. Changes of pixel position coordinates in the CCD camera obtained when the arrival timing is changed between 0 fs and 700 fs were checked A result obtained by plotting the detected values (◇ points) is shown in FIG. 11.

Figure 11:
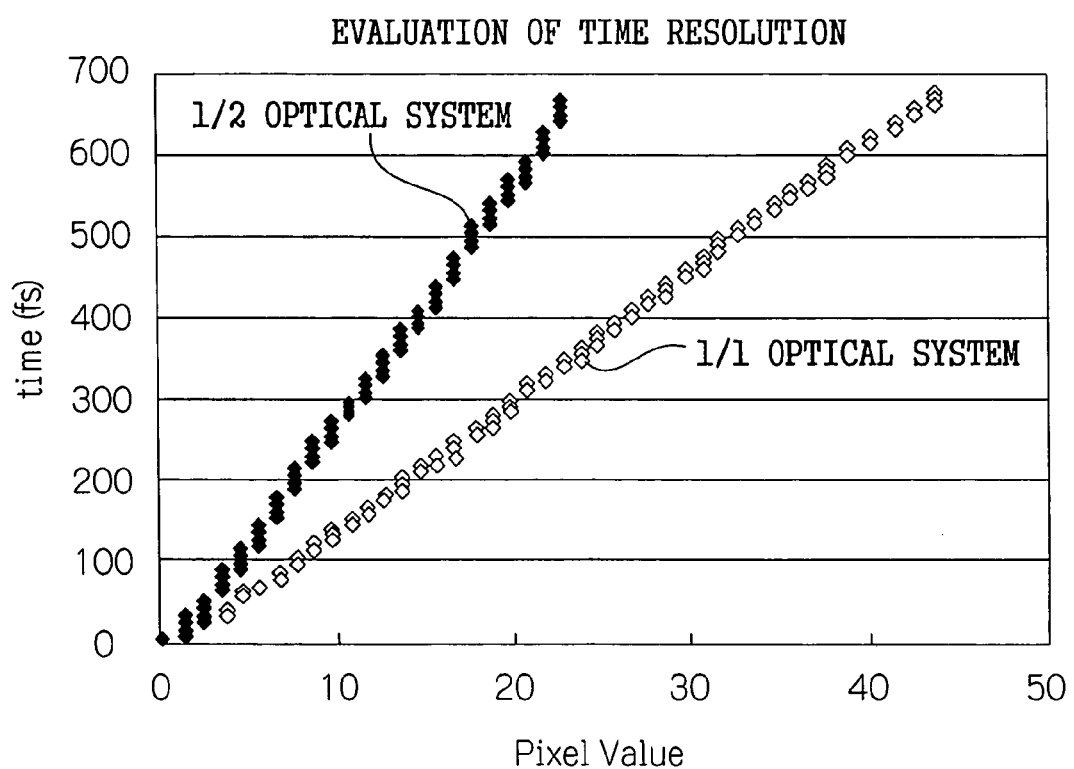
FIG. 11 is a graph showing a relation between a discrepancy value in optical pulse arrival timing and a pixel position coordinate difference.

As shown in FIG. 11, the deviation value (delay time) of the arrival timing increases in proportion to the pixel position coordinate difference. When a pixel on the CCD corresponding to a predetermined reference time is determined, therefore, a deviation value between the reference time and a beam pulse or pulse sequence time can be detected from FIG. 11 on the basis of a difference between the pixel corresponding to the reference time and a pixel at which the beam pulse sequence has been detected. In this example, one pixel on the CCD camera corresponds to approximately 16 fs.

In the case where an optical system is disposed between the optical switch 30 and the CCD camera so as to make the image forming magnification equal to ½, a plot represented by ◇ points is obtained. In this case, one pixel on the CCD camera corresponds to approximately 30 fs. In other words, as the image forming magnification increases, the time resolution is improved and a finer timing deviation value can be detected. If the number of pixels on the CCD is approximately the same, however, the dynamic range is decreased by making the image forming magnification larger.

Example 2

Figure 12:
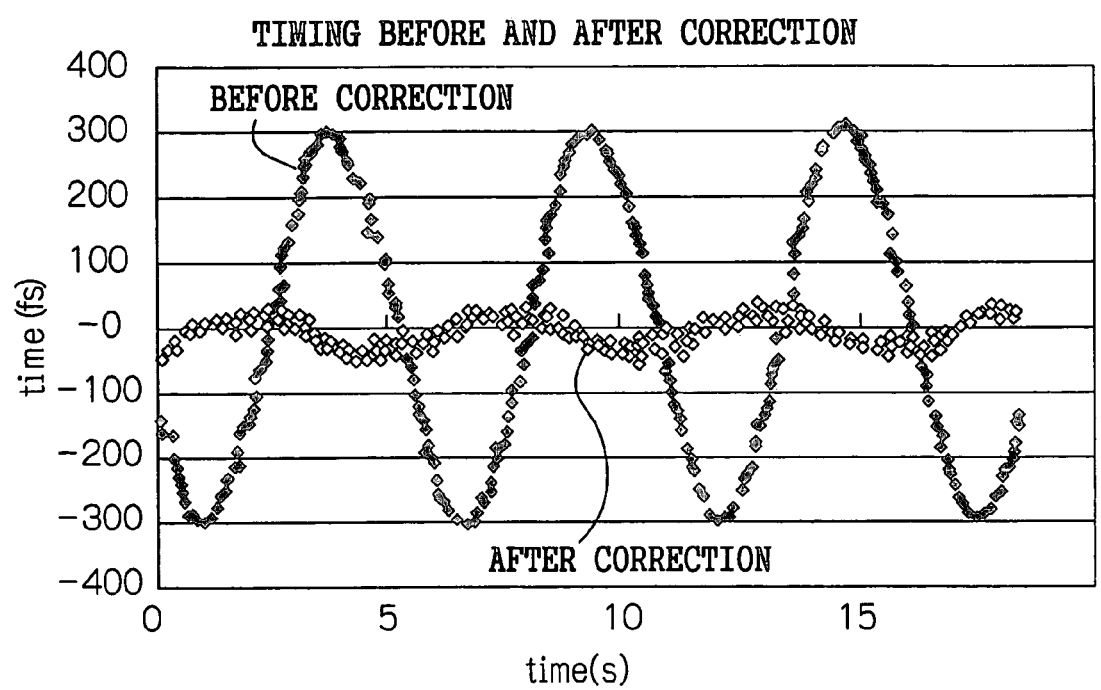
FIG. 12 is a graph showing how an optical pulse sequence having temporal fluctuation is corrected.

In this example, the temporal fluctuation in a signal beam pulse to be detected is corrected by the timing adjustment apparatus of the example 1 (see FIG. 10). In some cases, the beam pulse sequence has a periodically repeated temporal fluctuation as shown in FIG. 12. In this case, a spatial fluctuation in irradiation spots is also observed in the image on the CCD camera.

In the same way as the example 1, the beam pulse timing can be adjusted in real time by feeding back the computation result from the timing detection apparatus 206 to the optical variable delay apparatus 204 as occasion demands. Specifically, the timing computation unit 100 computes position coordinates at which a predetermined beam pulse has been detected, and inputs the computed position coordinates to the optical variable delay apparatus 204. The optical variable delay apparatus 204 computes a delay time of a beam pulse so as to retain a pixel, at which a predetermined beam pulse has been detected, in arbitrary position coordinates, changes an optical path length between the signal beam generation light source 202 and the optical switch 30 so as to achieve the computed delay time, and thereby adjusts the arrival timing of the beam pulse sequence. Even in the case where the beam pulse sequence has a periodically repeated temporal fluctuation with an amplitude of approximately 300 fs and a frequency of 0.2 Hz, therefore, the amplitude of the temporal fluctuation can be suppressed to approximately ⅙ as shown in FIG. 12 by conducting the correction. By the way, a plot of ◇ points represents the timing fluctuation before the correction, whereas a plot of ◇ points represents the timing fluctuation after the correction.

Example 3

In this example, a timing adjustment apparatus is formed by using the timing detection apparatus having the configuration shown in FIG. 1, and the arrival timing is adjusted so that a signal beam pulse sequence A and a signal beam pulse sequence B will arrive at the optical switch simultaneously.

Figure 13:
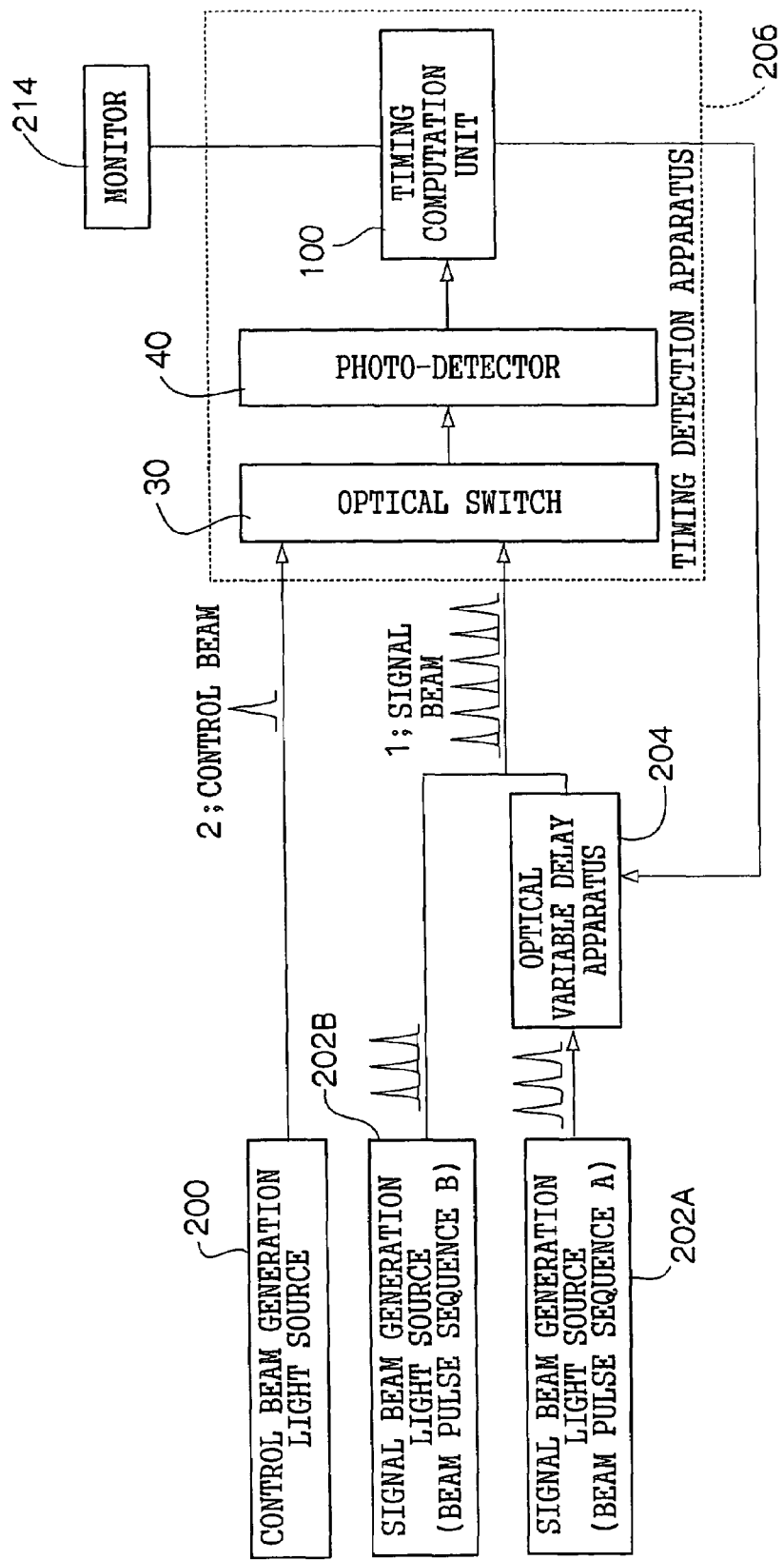
FIG. 13 is a diagram showing a configuration of a timing adjustment apparatus according to a third example.

As shown in FIG. 13, this timing adjustment apparatus includes a control beam generation light source 200 for generating a pulse sequence of a control beam 2, a signal beam generation light source 202A for generating a signal beam pulse sequence A, a signal beam generation light source 202B for generating a signal beam pulse sequence B and a timing detection apparatus 206. The signal beam pulse sequence A and the signal beam pulse sequence B are multiplexed and input to an optical switch 30 as a signal beam 1.

Between the signal beam generation light source 202A and the optical switch 30, an optical variable delay apparatus 204 for delaying the arrival timing of the signal beam pulse sequence A on the basis of a computation result (detection result) supplied from a timing computation unit 100 is disposed. Since other portions have the same configuration as that of the timing adjustment apparatus shown in FIG. 10, the same components are denoted by like reference numerals and description thereof will be omitted.

In this timing adjustment apparatus, the signal beam pulse sequence A supplied from the signal beam generation light source 202A and the signal beam pulse sequence B supplied from the signal beam generation light source 202B are input to the timing detection apparatus 206, and the arrival timing of each of the signal beam pulse sequences is computed. The timing detection apparatus 206 inputs a result of the computation to the optical variable delay apparatus 204. The optical variable delay apparatus 204 computes a delay time of the signal beam pulse sequence A required to make the detected arrival timing of the signal beam pulse sequence A coincide with the detected arrival timing of the signal beam pulse sequence B, changes an optical path length between the signal beam generation light source 202A and the optical switch 30 so as to achieve the computed delay time, and thereby adjusts the arrival timing of the beam pulse sequence A. By thus feeding back the computation result from the timing detection apparatus 206 to the optical variable delay apparatus 204 as occasion calls, the beam pulse timing can be adjusted in real time.

Figure 14:
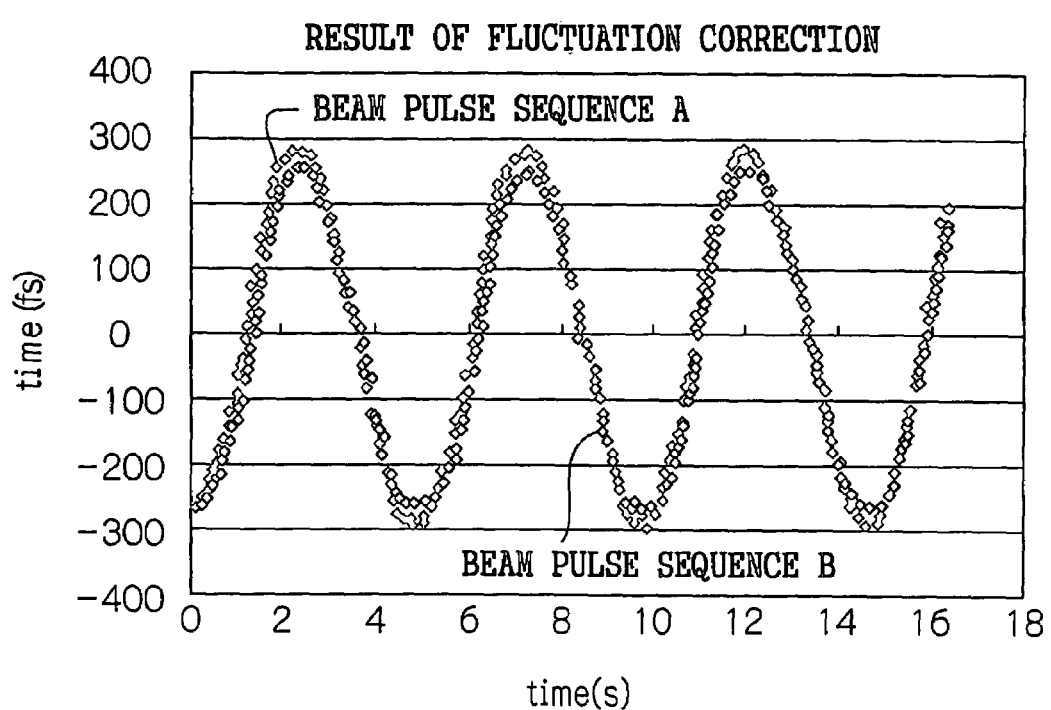
FIG. 14 is a graph showing how temporal fluctuations of optical pulse sequences of two kinds are made coincide with each other by correction.
Figure 15:
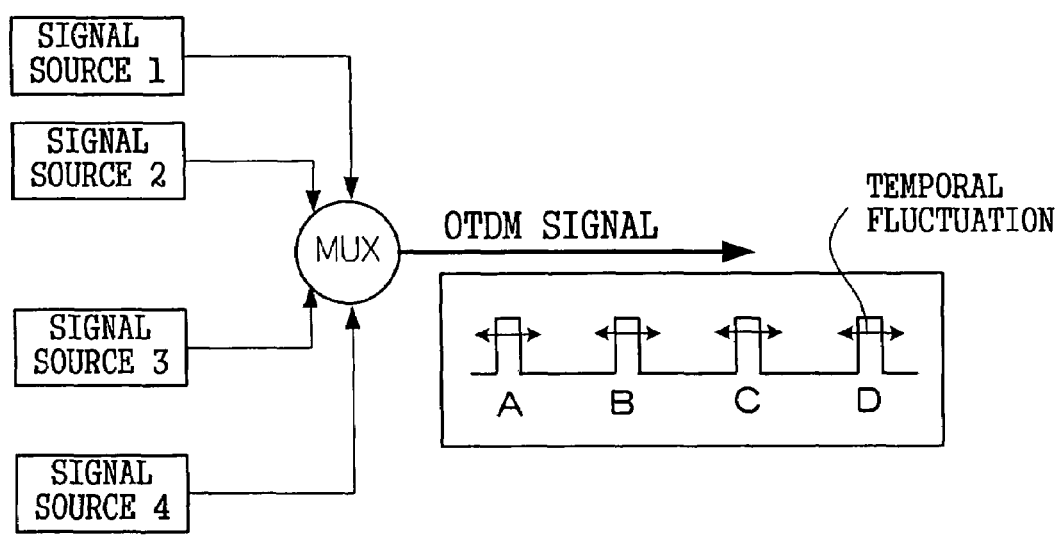
FIG. 15 is a diagram showing problems in an ultra-high speed OTDM technique.

As seen in FIG. 14, in the case where the beam pulse sequence B has a periodically repeated temporal fluctuation with an amplitude of approximately 300 fs and a frequency of 0.2 Hz, the time difference between the beam pulse sequence A and the beam pulse sequence B, i.e., the skew can be reduced by conducting the correction. Incidentally, a plot of ◇ points represents the temporal fluctuation in the beam pulse sequence A, whereas a plot of ◇ points represents the timing fluctuation in the beam pulse sequence B.

What is claimed is:

1. An optical pulse timing detection apparatus comprising:
    an optical switch for forming an on-state region at only an irradiated portion thereof when irradiated with a control beam pulse, and transmitting or reflecting incident signal beam pulses at the on-state region so as to spatially switch an optical path for the signal beam pulses;
    a photo-detector equipped with a plurality of pixels to detect signal beam pulses transmitted or reflected at the on-state region of the optical switch, at a pixel corresponding to the region; and
    a timing computation unit for acquiring position information of a pixel, at which a predetermined signal beam pulse has been detected, on the basis of a result of the detection conducted by the photo-detector, and computing timing of arrival of a predetermined signal beam pulse at the optical switch on the basis of the position information of the pixel and a time when a region corresponding to the pixel is brought into an on-state.

2. An optical pulse timing detection apparatus according to claim 1, wherein the optical switch is disposed perpendicularly to a travel direction of the incident signal beam pulses, and the optical switch is disposed so as to be inclined at a predetermined angle to a travel direction of the control beam pulse.

3. An optical pulse timing detection apparatus according to claim 1, wherein the optical switch is disposed perpendicularly to a travel direction of the control beam pulse, and the optical switch is disposed so as to be inclined at a predetermined angle to a travel direction of the incident signal beam pulses.

4. An optical pulse timing detection apparatus according to claim 1, wherein the optical switch is irradiated with the control beam pulse in synchronization with incidence timing of the signal beam pulses.

5. An optical pulse timing detection apparatus according to claim 1, wherein the photo-detector comprises a spot beam position sensor utilizing surface resistance of a photodiode.

6. An optical pulse timing detection apparatus according to claim 1, wherein the photo-detector comprises a CCD camera.

7. An optical pulse timing detection apparatus according to claim 1, wherein the photo-detector comprises a photodetector array.

8. An optical pulse timing detection apparatus according to claim 1, wherein an expansion optical system or a compression optical system is disposed between the optical switch and the photo-detector.

9. An optical pulse timing detection apparatus according to claim 1, wherein the optical switch comprises a functional thin film including a nonlinear optical material whose absorption coefficient is changed by irradiation with a beam, and whose relaxation time is short.

10. An optical pulse timing detection apparatus according to claim 9, wherein the optical switch forms an on-state region by using oversaturated absorption in the nonlinear optical material.

11. An optical pulse timing detection apparatus according to claim 9, wherein the optical switch forms an on-state region by using the optical Kerr effect in the nonlinear optical material.

12. An optical pulse timing detection apparatus according to claim 9, wherein the functional thin film comprises a dye molecular film.

13. An optical pulse timing detection apparatus according to claim 12, wherein the dye molecular film comprises a J-aggregate substance of a squarylium dye.

14. An optical pulse timing detection apparatus according to claim 1, further comprising a signal processing apparatus for conducting signal processing on an output signal of the photo-detector.

15. An optical pulse timing detection apparatus according to claim 14, wherein, due to the signal processing, a spatial position of a beam pulse is detected with a resolution finer than a spatial resolution of the photo-detector.

16. An optical pulse timing detection method comprising the steps of:
    using an optical switch for forming an on-state region at only an irradiated portion thereof when irradiated with a control beam pulse, irradiating the optical switch with a control beam pulse, and transmitting or reflecting incident signal beam pulses at the on-state region so as to spatially switch an optical path for the signal beam pulses;
    detecting signal beam pulses transmitted or reflected by the on-state region of the optical switch, at a pixel of a photo-detector equipped with a plurality of pixels, which pixel corresponds to the region;
    acquiring position information of a pixel at which a predetermined signal beam pulse has been detected, on the basis of a result of the detection conducted by the photo-detector; and
    computing timing of arrival of a predetermined signal beam pulse at the optical switch on the basis of the position information of the pixel and a time when a region corresponding to the pixel is brought into an on-state.

17. An optical pulse timing detection method according to claim 16, wherein signal processing is conducted on an output signal of the photo-detector.

18. An optical pulse timing detection method according to claim 17, wherein, due to the signal processing, a spatial position of a beam pulse is detected with a resolution finer than a spatial resolution of the photo-detector.

19. An optical pulse timing adjustment apparatus comprising:
    an optical switch for forming an on-state region at only an irradiated portion thereof when irradiated with a control beam pulse, and transmitting or reflecting incident signal beam pulses at the on-state region so as to spatially switch an optical path for the signal beam pulses;

a photo-detector equipped with a plurality of pixels to detect signal beam pulses transmitted or reflected at the on-state region of the optical switch, at a pixel corresponding to the region;

a timing computation unit for acquiring position information of a pixel, at which a predetermined signal beam pulse has been detected, on the basis of a result of the detection conducted by the photo-detector, and computing timing of arrival of a predetermined signal beam pulse at the optical switch on the basis of the position information of the pixel and a time when a region corresponding to the pixel is brought into an on-state; and a delay apparatus for delaying subsequent signal beam pulses on the basis of timing computed by the timing computation unit, wherein timing of arrival of the signal beam pulses at the optical switch is adjusted.

20. An optical pulse timing adjustment apparatus according to claim 19, wherein signal processing is conducted on an output signal of the photo-detector.

21. An optical pulse timing adjustment apparatus according to claim 20, wherein, due to the signal processing, a spatial position of a beam pulse is detected with a resolution finer than a spatial resolution of the photo-detector.

22. An optical pulse timing adjustment apparatus according to claim 19, wherein the delay apparatus delays subsequent signal beam pulses so as to make timing of arrival of the subsequent signal beam pulses at the optical switch become a predetermined timing.

23. An optical pulse timing adjustment apparatus comprising:

an optical switch for forming an on-state region at only an irradiated portion thereof when irradiated with a control beam pulse, and transmitting or reflecting incident signal beam pulses of a plurality of kinds at the on-state region so as to spatially switch optical paths for the signal beam pulses of the plurality of kinds;

a photo-detector equipped with a plurality of pixels to detect signal beam pulses of the plurality of kinds transmitted or reflected at the on-state region of the optical switch, at a pixel corresponding to the region;

a timing computation unit for acquiring position information of a pixel, at which a predetermined signal beam pulse has been detected, on the basis of a result of the detection conducted by the photo-detector, and computing timing of arrival of a predetermined signal beam pulse at the optical switch on the basis of the position information of the pixel and a time when a region corresponding to the pixel is brought into an on-state; and a plurality of delay apparatuses respectively provided for the kinds of signal beam pulses to delay subsequent signal beam pulses so as to make timing of arrival of signal beam pulses of the plurality of kinds at the optical switch become a predetermined timing, on the basis of timing computed by the timing computation unit, wherein timing of arrival of the signal beam pulses of the plurality of kinds at the optical switch is individually adjusted.

24. An optical pulse timing adjustment apparatus according to claim 19, wherein the delay apparatus changes a length of an optical path to the optical switch for signal beam pulses and thereby delays subsequent signal beam pulses.

25. An optical pulse timing adjustment method comprising the steps of:

using an optical switch for forming an on-state region at only an irradiated portion thereof when irradiated with a control beam pulse, irradiating the optical switch with a control beam pulse, and transmitting or reflecting incident signal beam pulses at the on-state region so as to spatially switch an optical path for the signal beam pulses;

detecting signal beam pulses transmitted or reflected by the on-state region of the optical switch, at a pixel of a photo-detector equipped with a plurality of pixels, which pixel corresponds to the region;

acquiring position information of a pixel at which a predetermined signal beam pulse has been detected, on the basis of a result of the detection conducted by the photo-detector;

computing timing of arrival of a predetermined signal beam pulse at the optical switch on the basis of the position information of the pixel and a time when a region corresponding to the pixel is brought into an on-state; and delaying subsequent signal beam pulses on the basis of the computed timing so as to adjust timing of arrival of the signal beam pulses at the optical switch.

* * * * *